United States Patent
Zhu et al.

(10) Patent No.: US 12,481,505 B2
(45) Date of Patent: Nov. 25, 2025

(54) MANAGING SPECULATIVE INSTRUCTION EXECUTION USING SPECULATIVE ID IN A GRAPHFLOW APPARATUS

(71) Applicant: Huawei Technologies Co., Ltd., Shenzhen (CN)

(72) Inventors: Fan Zhu, Shenzhen (CN); Ruoyu Zhou, Shenzhen (CN); Wenbo Sun, Hangzhou (CN); Xiping Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 18/312,365

(22) Filed: May 4, 2023

(65) Prior Publication Data
US 2023/0297385 A1    Sep. 21, 2023

Related U.S. Application Data

(63) Continuation of application No. PCT/CN2020/127243, filed on Nov. 6, 2020.

(51) Int. Cl.
G06F 9/38    (2018.01)
(52) U.S. Cl.
CPC .............. G06F 9/3842 (2013.01); G06F 9/38 (2013.01); G06F 9/3834 (2013.01)
(58) Field of Classification Search
CPC .. G06F 15/825; G06F 9/30189; G06F 9/3834; G06F 9/3842; G06F 9/3836; G06F 9/3838
See application file for complete search history.

(56) References Cited

U.S. PATENT DOCUMENTS

| | | | | |
|---|---|---|---|---|
| 5,799,179 | A * | 8/1998 | Ebcioglu | G06F 9/3863 712/216 |
| 6,098,166 | A * | 8/2000 | Leibholz | G06F 9/3824 712/216 |
| 10,515,049 | B1 | 12/2019 | Fleming et al. | |
| 2003/0084274 | A1* | 5/2003 | Gaither | G06F 9/3842 712/E9.05 |
| 2018/0011710 | A1* | 1/2018 | Guo | G06F 9/3856 |
| 2018/0341488 | A1 | 11/2018 | Burger | |

OTHER PUBLICATIONS

Rajagopalan Desikan, "Scalable Selective Re-Execution for EDGE Architectures," 11th International Conference on Architectural Support for Programming Languages and Operating Systems, Oct. 9-13, 2004, 13 pages.

* cited by examiner

*Primary Examiner* — Keith E Vicary
(74) *Attorney, Agent, or Firm* — Conley Rose, P.C.

(57) ABSTRACT

A graphflow apparatus includes an information buffer (IB) and a load queue (LQ). The IB is configured to cache an instruction queue. The LQ is used to cache a read instruction queue. The IB includes a speculative bit and a speculative identity (ID) field. The speculative bit indicates whether a current instruction is a speculatively-executable instruction. The speculative ID field stores a speculative ID of one speculative operation on the current instruction.

19 Claims, 16 Drawing Sheets

An IB issues a first instruction to an LQ, where the first instruction requests to read data, the first instruction satisfies a first preset condition, and the first preset condition includes: a speculative bit of the first instruction in the IB is set to "yes" — S401

The IB determines a first speculative ID, and stores the first speculative ID in a speculative ID field of the first instruction in the IB, where the first speculative ID indicates a current speculative operation — S402

IB 111

| Inst | op0 | rdy0 | vld0 | op1 | rdy1 | vld1 | spcID | prd | prdy | spc | sgo | stamp | dest0 | dest1 | pdest |
|------|-----|------|------|-----|------|------|-------|-----|------|-----|-----|-------|-------|-------|-------|
|      |     |      |      |     |      |      |       |     |      |     |     |       |       |       |       |
|      |     |      |      |     |      |      |       |     |      |     |     |       |       |       |       |
|      |     |      |      |     |      |      |       |     |      |     |     |       |       |       |       |
|      |     |      |      |     |      |      |       |     |      |     |     |       |       |       |       |

| Address | Destination | Data | Stamp | Speculative ID | Presence bit | Validity bit |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |

SB 142

| Address | Data | Stamp | Speculative ID | Validity bit |
|---|---|---|---|---|
|  |  |  |  |  |
|  |  |  |  |  |
|  |  |  |  |  |
|  |  |  |  |  |
|  |  |  |  |  |

MANAGING SPECULATIVE INSTRUCTION EXECUTION USING SPECULATIVE ID IN A GRAPHFLOW APPARATUS

CROSS-REFERENCE TO RELATED APPLICATIONS

This is a continuation of International Patent Application No. PCT/CN2020/127243 filed on Nov. 6, 2020, which is hereby incorporated by reference in its entirety.

TECHNICAL FIELD

This disclosure relates to the field of graphflow, and in particular, to an instruction processing method and a graphflow apparatus.

BACKGROUND

A dataflow architecture is a computer system architecture. Different from use of a program counter to indicate an instruction execution sequence in the mainstream von Neumann architecture in the industry, in the dataflow architecture, an execution sequence is determined by determining validity of a program parameter. In this manner, a dependence of instructions on a control flow is changed into a dependence on a dataflow, so that the dataflow architecture has a great advantage in using parallelism. However, a conventional dataflow architecture further needs to support a control flow. Such a "dataflow+control flow" computer architecture is collectively referred to as a graphflow apparatus or a graphflow architecture.

Memory aliasing is a common problem that affects access efficiency of hardware during execution of instruction sequences. The memory aliasing refers to a case in which two pointers point to one storage address at the same time. In the von Neumann architecture, a program execution sequence needs to comply with a true dependence between instructions. For example, in the following example of executing instructions:

Instruction 1: R3<=R1+R2.
Instruction 2: R4<=R5+R3.

Because R3 in the instruction 2 needs to be dependent on completion of the instruction 1, the instruction 2 can be executed only after a result of the instruction 1 is calculated. In this example, a dependence relationship exists between the instruction 2 and the instruction 1. However, the dependence relationship is static and can be easily identified by a processor. A dependence relationship on a value is also referred to as a data dependence. However, for access instructions, a dependence relationship caused by memory aliasing further exists. The dependence relationship cannot be identified by the processor in advance before a program is executed. Therefore, access efficiency of hardware is often affected. For example, as shown in the following example:

Instruction 3: store R1, 2 (R2).
Instruction 4: load R3, 4 (R4).

The instruction 3 represents storing data in the register R1 at the address (R2+2), and the instruction 4 represents reading data at the address (R4+4) into the register R3. Because the dependence between the access instructions cannot be determined in advance by identifying a register number, whether the dependence relationship exists can be known only after results of R2+2 and R4+4 are calculated. Therefore, a sequence dependence exists between the two instructions. That is, the instruction 4 can be executed only after the instruction 3 is executed. If the addresses are different, no sequence dependence exists. That is, an execution sequence of the two instructions does not affect correctness of the program. Therefore, the instruction 4 needs to be delayed and is issued only when the dependence between the access instructions is confirmed. However, in most cases, R2+2 is not equal to R4+4. That is, a sequence dependence does not exist in most cases. In this case, the delay of the instruction 4 reduces the efficiency.

To resolve this problem, mainstream computer systems all use a speculative execution manner. That is, before addresses are obtained, it is assumed that a sequence dependence is not established, so that read instructions are speculatively executed. In actual applications, most sequence dependences are not established. Therefore, speculatively executed read instructions are not affected, and a large amount of time for waiting for address calculation is saved. In a few cases, if a sequence dependence is established, speculative behavior is abolished, and a computer system clears and re-executes read operations and other subsequent operations that have entered a pipeline.

In the speculative execution manner, if speculative execution fails, all instructions following an instruction with a speculative failure in the pipeline are cleared. As a result, some instructions that are not related to the speculative failure are re-executed, resulting in performance loss. Similarly, a graphflow apparatus based on a dataflow architecture also faces a memory aliasing problem when executing a program. Therefore, how to improve efficiency of speculative execution in the dataflow architecture needs to be urgently resolved.

SUMMARY

This disclosure provides an instruction processing method and a graphflow apparatus, which can improve efficiency of speculative execution and reduce costs of a speculation failure.

According to a first aspect, an instruction processing method is provided. The method is applied to a graphflow apparatus. The graphflow apparatus is based on a dataflow architecture. The graphflow apparatus includes at least one process engine (PE) and a load store unit (LSU). The PE includes an information buffer (IB). The IB is configured to cache an instruction queue. The PE is configured to execute an instruction cached in the IB. The IB includes a speculative bit and a speculative identity (spcID) field. The speculative bit indicates whether a current instruction is a speculatively-executable instruction. The speculative ID field stores a speculative ID of one speculative operation on the current instruction. The LSU includes a load queue (LQ). The LQ is used to cache a read instruction queue. The method includes the following. The IB issues a first instruction to the LQ, where the first instruction requests to read data, the first instruction satisfies a first preset condition, and the first preset condition includes: a speculative bit of the first instruction in the IB is set to "yes". The IB determines a first speculative ID, and stores the first speculative ID in a speculative ID field of the first instruction in the IB, where the first speculative ID indicates a current speculative operation.

The dataflow architecture executes an instruction that is based on a data dependence graph. The data dependence graph may refer to a dataflow graph including nodes and directed arcs connecting the nodes. The nodes represent operations or functions to be performed, and the directed arcs represent sequences in which the nodes are executed.

The speculative operation may mean that if an instruction may be dependent on another instruction and the other instruction is not executed, an operation of the instruction is first executed. If it is confirmed that the other instruction does not have a dependence relationship with the instruction after the other instruction is executed, speculation succeeds. If it is confirmed that the other instruction has a dependence relationship with the instruction after the other instruction is executed, speculation fails.

A speculative bit and a speculative ID field are set for an instruction in the IB of the graphflow apparatus, so that the graphflow apparatus determines, based on the speculative bit, whether a speculative operation can be performed on the instruction, and indicates the speculative operation by using a speculative ID, so that a speculative source can be marked by using the speculative ID. When a speculative error occurs, only an instruction having an association relationship with the speculative ID is cleared and re-executed, and an instruction unrelated to the speculative ID is not re-executed. This reduces costs of the speculative error, and improves efficiency of executing a speculative operation on an access instruction in the dataflow architecture.

Optionally, the case in which the speculative bit is "yes" includes a case in which the first instruction may be speculatively dependent on another instruction. For example, a speculative dependence relationship exists between the first instruction and a third instruction. The speculative dependence relationship represents that the first instruction may be dependent on the third instruction, and the first instruction is speculatively executable.

Optionally, the first instruction and the third instruction satisfy a second preset condition, the second preset condition includes that the first instruction follows the third instruction in an ideal execution sequence, the first instruction may have a memory dependence relationship with the third instruction, and the memory dependence relationship means that a sequential dependence relationship exists between access instructions due to operations on a same address.

With reference to the first aspect, in a possible implementation, the LQ includes the speculative ID field, and the method further includes the following. After the IB issues the first instruction to the LQ, the LQ assigns the first speculative ID to the first instruction, and writes the first speculative ID into a speculative ID field of the first instruction in the LQ. The LQ sends the first speculative ID to the IB. That the IB determines a first speculative ID includes the following. The IB receives the first speculative ID from the LQ.

With reference to the first aspect, in a possible implementation, the speculative ID is a one-hot code.

The one-hot code is used for the speculative ID. Because a new speculative ID obtained after an OR operation is performed on two one-hot codes can still retain information about a previous speculative ID, after a speculative operation fails, a source of the speculative operation can be quickly found by using the one-hot code, to clear and re-execute an instruction related to the speculative operation. This improves efficiency of executing a speculative operation on an access instruction in the dataflow architecture.

With reference to the first aspect, in a possible implementation, the method further includes the following. The LQ searches, based on the first instruction, a store buffer (SB) or memory for and obtains the data that the first instruction requests to read.

Optionally, the memory may be on-chip memory or may be off-chip memory. Alternatively, it may be understood that, the memory is a storage device other than the SB.

With reference to the first aspect, in a possible implementation, the method further includes the following. After the data that the first instruction requests to read is obtained, the LQ transmits the first speculative ID to a speculative ID field of a second instruction in the IB, where the second instruction is dependent on the first instruction.

After a speculative operation, the second instruction that has a dependence relationship with the first instruction also carries the first speculative ID, so that after the speculative operation fails, an instruction associated with the first speculative ID is searched for based on the first speculative ID. This improves efficiency of the speculative operation.

Optionally, if the second instruction further depends on a fourth instruction, the fourth instruction is an instruction on which a speculative operation has been performed, and the speculative operation corresponds to a third speculative ID, the IB may generate a fourth speculative ID based on the first speculative ID and the third speculative ID, and store the fourth speculative ID into the speculative ID field of the second instruction in the IB.

By using a feature that the speculative ID is a one-hot code, the fourth speculative ID may retain information about the first speculative ID and the third speculative ID, that is, the fourth speculative ID may indicate both the speculative operations corresponding to the first speculative ID and the third speculative ID, so that a plurality of speculative operations can be traced based on the fourth speculative ID. After any speculative operation fails, an instruction related to the speculative operation can be traced and cleared based on the fourth speculative ID. This reduces costs of a speculative failure.

With reference to the first aspect, in a possible implementation, the IB further includes a speculative flag bit, the speculative flag bit indicates whether the current instruction has been speculatively issued, and the method further includes the following. After the IB issues the first instruction to the LQ, the IB sets a speculative flag bit of the first instruction to "yes".

With reference to the first aspect, in a possible implementation, the IB further includes a speculative flag bit, the speculative flag bit indicates whether the current instruction has been speculatively issued, and the method further includes the following. After the data that the first instruction requests to read is obtained, the IB issues the second instruction, where the second instruction is dependent on the first instruction. After the second instruction is issued, the IB sets a speculative flag bit of the second instruction to "yes".

With reference to the first aspect, in a possible implementation, the IB further includes a dependence validity bit and a dependence presence bit, the dependence validity bit indicates whether the current instruction is executed only after execution of another instruction is completed, and the dependence presence bit indicates whether execution of an instruction on which the current instruction is dependent is completed, and the first preset condition further includes a dependence validity bit of the first instruction in the IB is set to "yes", and a dependence presence bit is set to "no".

With reference to the first aspect, in a possible implementation, the IB further includes at least one parameter field, at least one parameter field validity bit, and at least one parameter field presence bit, where the at least one parameter field is in a one-to-one correspondence with the at least one parameter field validity bit, the at least one parameter field validity bit is in a one-to-one correspondence with the at least one parameter field presence bit, the parameter field stores input data of the current instruction, the parameter field validity bit indicates whether a parameter field corresponding to the parameter field validity bit is valid, and the parameter field presence bit indicates whether data exists in a parameter field corresponding to the parameter field presence bit, and the first preset condition further includes a first parameter field presence bit in the at least one parameter field validity bit is set to "yes", a parameter field presence bit corresponding to a first parameter field validity bit is set to "yes", and the first parameter field validity bit is any one of the at least one parameter field validity bit.

With reference to the first aspect, in a possible implementation, the LSU further includes a store buffer SB, where the SB is configured to cache a stored instruction queue, and the method further includes the following. The IB determines, based on a storage address of the third instruction and a read address of the first instruction, whether a speculative operation on the first instruction corresponding to the first speculative ID is incorrect. The IB reissues the first instruction to the LQ if the speculative operation on the first instruction corresponding to the first speculative ID is incorrect.

With reference to the first aspect, in a possible implementation, the method further includes the following. The IB determines, based on a storage address of the third instruction and a read address of the first instruction, whether a speculative operation on the first instruction corresponding to the first speculative ID is incorrect. The IB reissues the first instruction to the LQ if the speculative operation on the first instruction corresponding to the first speculative ID is incorrect.

With reference to the first aspect, in a possible implementation, the method further includes the following. After the IB reissues the first instruction to the LQ, the LQ reassigns a second speculative ID to the first instruction, and writes the second speculative ID LQ into the speculative ID field of the first instruction in the LQ. The LQ transmits the second speculative ID to the speculative ID field of the first instruction in the IB.

In embodiments of this disclosure, one speculative ID indicates one speculative operation. Therefore, when the first instruction is re-executed, the LQ assigns a new speculative ID to the first instruction, so that the new speculative ID is used to re-trace an instruction related to a new speculative operation. This improves efficiency of the speculative operation.

With reference to the first aspect, in a possible implementation, the method further includes the following. The IB broadcasts the first speculative ID to the at least one PE, the LQ, or the SB if the speculative operation corresponding to the first speculative ID is incorrect. The at least one PE, the LQ, or the SB compares the first speculative ID with a speculative ID of an instruction being executed by the at least one PE, the LQ, or the SB, to determine whether an association relationship exists between the first speculative ID and the speculative ID of the instruction being executed. If an association relationship exists, the at least one PE, the LQ, or the SB stops executing the instruction being executed, and stops transmitting data or a dependence relationship of the instruction being executed.

If the speculative operation on the first instruction is incorrect, the IB broadcasts the first speculative ID of the first instruction to a pipeline in the graphflow apparatus, so that only an instruction related to the speculative operation is cleared, and an instruction that follows the speculative operation and that is unrelated to the speculative operation is not cleared. This reduces costs of a speculative failure and improves efficiency of the speculative operation.

With reference to the first aspect, in a possible implementation, the IB further includes stamps, the stamps indicate an ideal execution sequence of the access instructions, and the access instructions include storage instructions or read instructions.

The graphflow apparatus executes the instruction in the data dependence graph. During compilation of the data dependence graph, the graphflow apparatus assigns stamps to the access instructions in the instructions, to indicate an ideal execution sequence of the access instructions. The stamps may be used as auxiliary information for instruction execution, to support correct execution of the access instructions. This improves efficiency of memory access based on the dataflow architecture.

With reference to the first aspect, in a possible implementation, the SB and the LQ also include the stamps.

According to a second aspect, a graphflow apparatus is provided. The graphflow apparatus is based on a dataflow architecture. The graphflow apparatus includes at least one PE and an LSU. The PE includes an IB. The IB is configured to cache an instruction queue. The PE is configured to execute an instruction cached in the IB. The IB includes a speculative bit and a speculative ID field. The speculative bit indicates whether a current instruction is a speculatively-executable instruction. The speculative ID field stores a speculative ID of one speculative operation on the current instruction. The LSU includes a load queue LQ. The LQ is used to cache a read instruction queue.

A speculative bit and a speculative ID field are set for an instruction in the IB of the graphflow apparatus, so that the graphflow apparatus determines, based on the speculative bit, whether a speculative operation can be performed on the instruction, and indicates the speculative operation by using a speculative ID, so that a speculative source can be marked by using the speculative ID. When a speculative error occurs, only an instruction having an association relationship with the speculative ID is cleared and re-executed, and an instruction unrelated to the speculative ID is not re-executed. This reduces costs of the speculative error, and improves efficiency of executing a speculative operation on an access instruction in the dataflow architecture.

With reference to the second aspect, in a possible implementation, the speculative ID in the speculative ID field is a one-hot code.

With reference to the second aspect, in a possible implementation, the IB is configured to perform the following operations the following. The IB issues a first instruction to the LQ, where the first instruction requests to read data, the first instruction satisfies a first preset condition, and the first preset condition includes a speculative bit of the first instruction in the IB is set to "yes". The IB determines a first speculative ID, and stores the first speculative ID in a speculative ID field of the first instruction in the IB, where the first speculative ID indicates a current speculative operation.

With reference to the second aspect, in a possible implementation, the LQ includes the speculative ID field, and the LQ is configured to, after the IB issues the first instruction to the LQ, assign the first speculative ID to the first instruction, and write the first speculative ID into a speculative ID field of the first instruction in the LQ, and send the first speculative ID to the IB, and the IB is further configured to receive the first speculative ID from the LQ.

With reference to the second aspect, in a possible implementation, the LQ is configured to search, based on the first instruction, an SB or memory for and obtain the data that the first instruction requests to read.

With reference to the second aspect, in a possible implementation, the IB is further configured to, after the data that the first instruction requests to read is obtained, issue a second instruction, where the second instruction is dependent on the first instruction, and after the second instruction is issued, set a speculative flag bit of the second instruction to "yes".

With reference to the second aspect, in a possible implementation, the IB further includes a dependence validity bit and a dependence presence bit, the dependence validity bit indicates whether the current instruction is executed only after execution of another instruction is completed, and the dependence presence bit indicates whether execution of an instruction on which the current instruction is dependent is completed.

With reference to the second aspect, in a possible implementation, the first preset condition further includes a dependence validity bit of the first instruction in the IB is set to "yes", and a dependence presence bit is set to "no".

With reference to the second aspect, in a possible implementation, the LSU further includes a store buffer SB, and the SB is configured to cache a stored instruction queue.

With reference to the second aspect, in a possible implementation, the IB is further configured to, after the first instruction is issued, issue a third instruction to the SB, where the third instruction is a storage instruction, the first instruction and the third instruction satisfy a second preset condition, the second preset condition includes that the first instruction follows the third instruction in an ideal execution sequence, the first instruction may have a memory dependence relationship with the third instruction, and the memory dependence relationship means that a sequential dependence relationship exists between access instructions due to operations on a same address, an after the third instruction is issued, send a storage address of the third instruction to the LQ.

With reference to the second aspect, in a possible implementation, the IB is further configured to determine, based on the storage address of the third instruction and a read address of the first instruction, whether a speculative operation on the first instruction corresponding to the first speculative ID is incorrect, and reissue the first instruction to the LQ if the speculative operation on the first instruction corresponding to the first speculative ID is incorrect.

With reference to the second aspect, in a possible implementation, the LQ is further configured to, after the IB reissues the first instruction to the LQ, reassign a second speculative ID to the first instruction, and write the second speculative ID into the speculative ID field of the first instruction in the LQ, and transmit the second speculative ID to the speculative ID field of the first instruction in the IB.

With reference to the second aspect, in a possible implementation, the IB is further configured to broadcast the first speculative ID to the at least one PE, the LQ, or the SB if the speculative operation corresponding to the first speculative ID is incorrect, and the at least one PE, the LQ, or the SB is configured to compare the first speculative ID with a speculative ID of an instruction being executed by the at least one PE, the LQ, or the SB, to determine whether an association relationship exists between the first speculative ID and the speculative ID of the instruction being executed, and if an association relationship exists, stop executing the instruction being executed, and stop transmitting data or a dependence relationship of the instruction being executed.

With reference to the second aspect, in a possible implementation, the IB further includes stamps, the stamps indicate an ideal execution sequence of the access instructions, and the access instructions include storage instructions or read instructions.

With reference to the second aspect, in a possible implementation, the SB and the LQ also include the stamps.

According to a third aspect, an instruction processing method is provided, including obtaining program code, determining a plurality of instructions in the program code and a dependence relationship between the plurality of instructions, and determining a data dependence graph based on the plurality of instructions and the dependence relationship, determining a plurality of instructions in the program code and a dependence relationship between the plurality of instructions includes, for instructions whose dependence relationship cannot be identified in the plurality of instructions, establishing a speculative dependence relationship between a first instruction and a third instruction that satisfy a second preset condition, where the second preset condition includes the first instruction is a read instruction, the third instruction is a storage instruction, the first instruction follows the third instruction in an ideal execution sequence, the first instruction may have a memory dependence relationship with the third instruction, and the memory dependence relationship means that a sequential dependence relationship exists between access instructions due to operations on a same address.

The speculative dependence relationship may mean that the first instruction may be dependent on the third instruction, and the first instruction is speculatively executable.

During compilation of a data dependence graph, if a read instruction is followed by another read instruction, a speculative dependence relationship may be established by using a feature of executing the data dependence graph in a dataflow architecture, so that the speculative dependence relationship is identified in a compilation phase, making it convenient for the dataflow architecture to perform a speculative operation when a program is subsequently executed. This improves efficiency of memory access based on the dataflow architecture.

With reference to the third aspect, in a possible implementation, determining a plurality of instructions in the program code and a dependence relationship between the plurality of instructions further includes, for instructions between which a dependence relationship can be identified in the plurality of instructions, establishing a dependence relationship between the instructions, and for instructions whose dependence relationship cannot be identified in the plurality of instructions, determining not to establish a dependence relationship between the instructions.

With reference to the third aspect, in a possible implementation, determining a plurality of instructions in the program code and a dependence relationship between the plurality of instructions further includes assigning stamps to access instructions in the plurality of instructions, where the stamps indicate an ideal execution sequence of the access instructions, and the access instructions include storage instructions or read instructions.

With reference to the third aspect, in a possible implementation, when a plurality of branches exist in the access instructions of the plurality of instructions, counting starts from a last stamp of a first branch at a position where the plurality of branches converge, where the first branch is a branch that has a largest quantity of access instructions in the plurality of branches.

With reference to the third aspect, in a possible implementation, the dependence relationship includes at least one of the following: a data dependence relationship, a memory dependence relationship, and a control dependence relationship.

According to a fourth aspect, an instruction processing method is provided, including obtaining program code, determining a plurality of instructions in the program code and a dependence relationship between the plurality of instructions, and determining a data dependence graph based on the plurality of instructions and the dependence relationship, where determining a plurality of instructions in the program code and a dependence relationship between the plurality of instructions includes assigning stamps to access instructions in the plurality of instructions, where the stamps indicate an ideal execution sequence of the access instructions, and the access instructions include storage instructions or read instructions.

During compilation of the data dependence graph, the graphflow apparatus assigns stamps to the access instructions in the instructions, to indicate an ideal execution sequence of the access instructions. The stamps may be used as auxiliary information for instruction execution, to support correct execution of the access instructions.

With reference to the fourth aspect, in a possible implementation, when a plurality of branches exist in the access instructions of the plurality of instructions, counting starts from a last stamp of a first branch at a position where the plurality of branches converge, where the first branch is a branch that has a largest quantity of access instructions in the plurality of branches.

The stamps may provide a solution to an execution sequence when branches converge if a plurality of branches are in parallel. This improves efficiency of memory access based on a dataflow architecture.

According to a fifth aspect, an instruction processing apparatus is provided. The apparatus includes a functional unit. The functional unit is configured to execute instructions of the method in any one of the third aspect or the possible implementations of the third aspect, or instructions of the method in any one of the fourth aspect or the possible implementations of the fourth aspect.

According to a sixth aspect, a computer storage medium is provided configured to store instructions. When the instructions run on a graphflow apparatus, the graphflow apparatus is enabled to execute the instructions of the method in any one of the first aspect or the possible implementations of the first aspect.

According to a seventh aspect, a computer storage medium is provided configured to store instructions. When the instructions run on a computer, the computer is enabled to perform the instructions of the method in any one of the third aspect or the possible implementations of the third aspect, or perform the instructions of the method in any one of the fourth aspect or the possible implementations of the fourth aspect.

BRIEF DESCRIPTION OF DRAWINGS

FIG. 5 is a schematic diagram of a structure of an IB 111 according to an embodiment of this disclosure;

DESCRIPTION OF EMBODIMENTS

The following describes technical solutions of this disclosure with reference to accompanying drawings.

Figure 1:
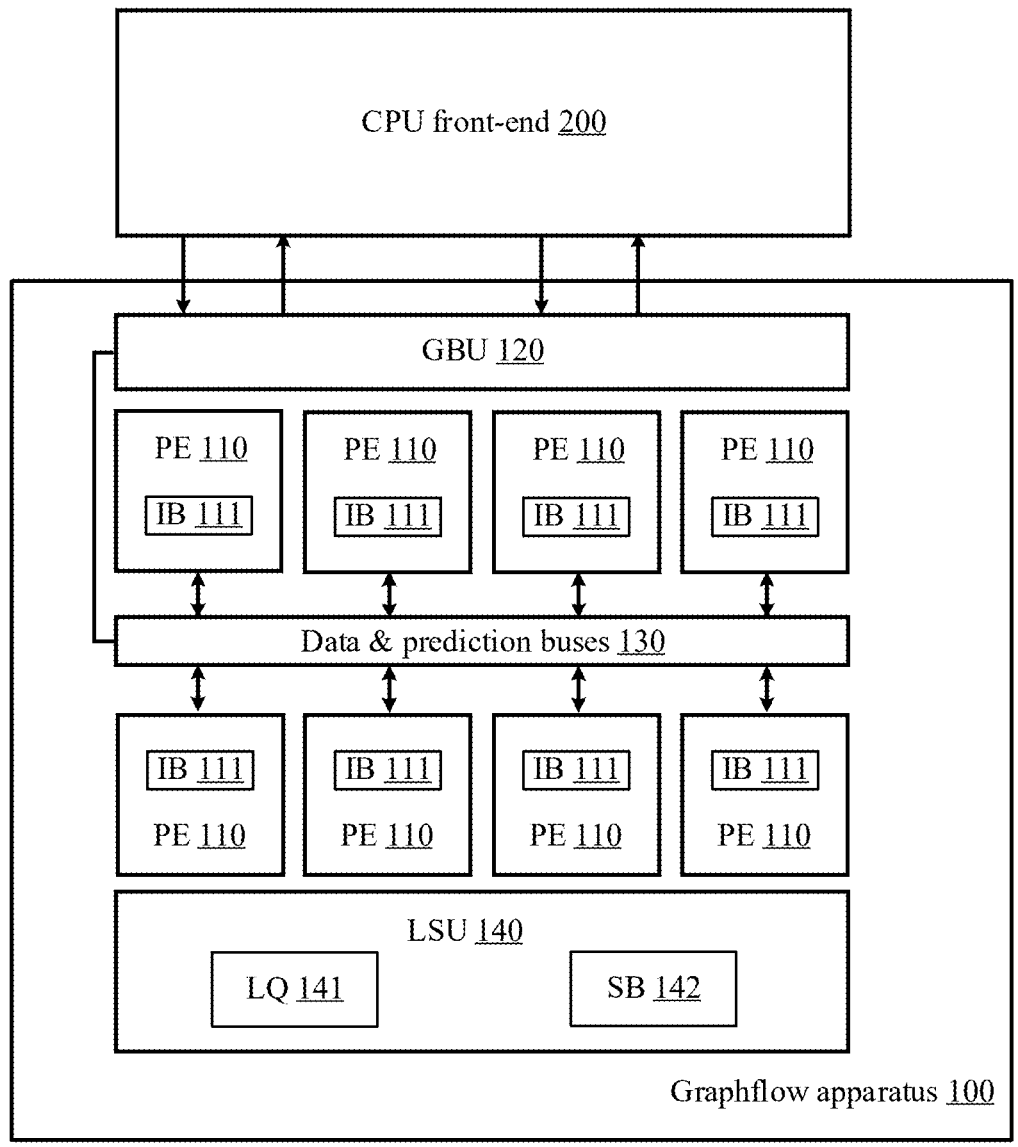
FIG. 1 is a schematic diagram of a structure of a graphflow apparatus 100 according to an embodiment of this disclosure.

FIG. 1 is a schematic diagram of a structure of a graphflow apparatus 100 according to an embodiment of this disclosure. As shown in FIG. 1, the graphflow apparatus 100 includes a PE 110, a graph build unit (GBU) 120, data & prediction buses 130, and an LSU 140. The graphflow apparatus 100 may include one or more PEs 110. In FIG. 1, an example in which eight PEs 110 are included is used for description. It is to be understood that a quantity of PEs 110 may be reduced or increased.

Optionally, the graphflow apparatus 100 may be used as a part of a central processing unit (CPU), to accelerate instruction execution and reduce power consumption of the CPU by using parallelism between instructions and a low power consumption advantage of a graphic architecture.

The GBU 120 is mainly configured to initialize a graph instruction, and send the graph instruction to each PE 110.

The PE 110 is mainly configured to execute a graph instruction stored in the PE, and send data or a request to another unit in the graphflow apparatus 100, for example, another PE 110 or the LSU 140. The PE 110 includes an IB 111. The IB 111 is configured to cache dataflow instructions, select an instruction that is ready, and issue the instruction into the PE 110 or the LSU 140 for execution.

Optionally, the PE 110 further includes a control unit (not shown in FIG. 1). The control unit may be configured to control the IB 111 to perform a corresponding function, for example, control the IB 111 to issue an instruction or receive data and information. It may be understood that, in embodiments of this disclosure, a method performed by the IB 111 is controlled by the control unit in the PE 110. For brevity, in embodiments of this disclosure, a function that the control unit in the PE 110 controls the IB 111 to implement is described as being performed by the IB 111.

The data & prediction buses 130 are mainly configured to transfer data and dependence information between the PEs 110. The dependence information may be information that indicates a dependence relationship between instructions.

The LSU 140 is mainly configured to receive and execute access instructions from the PEs 110. The access instructions include storage instructions and read instructions. The LSU 140 further includes an LQ 141 and an SB 142. The LQ 141 is used to cache a queue of instructions for requesting to read data from memory. The SB 142 is configured to cache a queue of instructions for requesting to store data in the memory. In some examples, the SB 142 may further be configured to transmit data to the LQ 141, to avoid power consumption and latency caused by memory access.

In some examples, the IB 111 may also be referred to as an instruction information cache, the LQ 141 may also be referred to as a read request cache, and the SB 142 may also be referred to as a storage request cache.

Optionally, the LSU 140 includes a control unit (not shown in FIG. 1). The control unit may be configured to control the LQ 141 and the SB 142 to perform corresponding functions, for example, control the LQ 141 and the SB 142 to send or receive data and information. It may be understood that, in embodiments of this disclosure, methods performed by the LQ 141 and the SB 142 are controlled and performed by the control unit in the LSU 140. For brevity, in embodiments of this disclosure, a function that the control unit in the LSU 140 controls the LQ 141 or the SB 142 to implement is described as being performed by the LQ 141 or the SB 142.

FIG. 1 further shows a CPU front-end 200, which mainly includes an instruction fetching and decoding unit at the CPU front-end configured to read and parse instruction content from memory, and send a graph instruction to the graphflow apparatus 100. It is to be noted that the CPU front-end 200 does not belong to a hardware part of the graphflow apparatus 100.

It is to be understood that the graphflow apparatus 100 is a hardware system based on a dataflow architecture. In the dataflow architecture, a dependence relationship between instructions is explicitly described at an instruction set layer, and parallelism between instructions is directly presented to hardware for execution. The dataflow architecture can be abstracted into a directed graph including N nodes, that is, a data dependence graph. A connection between nodes represents a dataflow. Once an input of each node is ready, a current node can perform an operation and transfer a result to a next node. Nodes that are in a same graph and that are not on a same path can run concurrently.

It is to be understood that the graphflow apparatus 100 in FIG. 1 is merely used as an example. In practice, operations such as combination and replacement may be performed on units in the graphflow apparatus 100, or more or fewer units are included. This is not limited in embodiments of this disclosure.

The compilation of the dataflow architecture is also different from that of a mainstream Von Neumann architecture. For each assembly instruction of the dataflow architecture, it is not necessary to specify an input of a program, and it is only necessary to specify a destination of an output result of the instruction. The code described as such may make it easy for hardware to discover a dependence chain between instructions.

This disclosure uses the foregoing advantages to optimize access instructions. A method for speculatively executing access instructions in a dataflow architecture is provided. This method improves efficiency of access instructions in the dataflow architecture. In addition, based on a characteristic of executing a data dependence graph in the dataflow architecture, a speculative characteristic of access instructions is used to accelerate running of graph instructions. This reduces re-execution costs after speculation fails. That is, after a speculation failure, only an instruction that is dependent on a speculative failure result is re-executed. This improves efficiency of memory access of the graphflow apparatus based on the dataflow architecture.

The data dependence graph may be a dataflow graph including nodes and directed arcs connecting the nodes. The nodes represent operations or functions to be performed, and the directed arcs represent sequences in which the nodes are executed. Nodes in different paths in the data dependence graph may be executed in parallel.

A speculative operation may mean that if an instruction may be dependent on another instruction and the other instruction is not executed, an operation of the instruction is first executed. If it is confirmed that the other instruction does not have a dependence relationship with the instruction after the other instruction is executed, speculation succeeds. If it is confirmed that the other instruction has a dependence relationship with the instruction after the other instruction is executed, speculation fails.

Before the graphflow apparatus 100 processes an instruction, a compiler first needs to analyze a dependence relationship between instructions based on an original program, and compiles the original program into an instruction set based on a data dependence graph based on the dependence relationship. Then, the compiled instruction set is sent to the IB 111 in the graphflow apparatus 100, making it convenient for the graphflow apparatus 100 to execute instructions. An instruction processing method executed on a compiler side is first described below.

Figure 2:
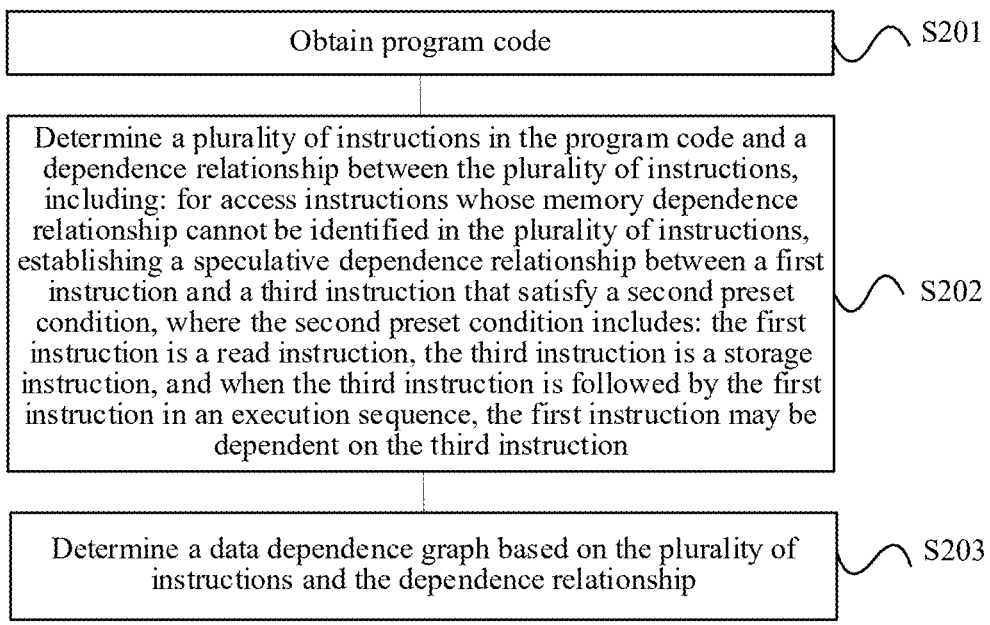
FIG. 2 is a schematic flowchart of an instruction processing method according to an embodiment of this disclosure.

FIG. 2 is a schematic flowchart of an instruction processing method according to an embodiment of this disclosure. The method may be executed by a compiler. As shown in FIG. 2, the method includes the following steps.

S201: Obtain program code.

The foregoing program code may be a source file written in a language supported by a development tool.

S202: Determine a plurality of instructions in the program code and a dependence relationship between the plurality of instructions.

Optionally, the dependence relationship includes at least one of the following: a data dependence relationship, a memory dependence relationship, and a control dependence relationship. The data dependence relationship may mean that one instruction needs to obtain data transmitted by another instruction before the instruction can be executed. The memory dependence relationship may mean that a sequential dependence relationship exists between access instructions due to operations on a same address. The control dependence relationship may refer to a conditional dependence caused by a control flow. For example, if a previous instruction is a conditional statement, a control dependence relationship is generated between a subsequent instruction and the previous instruction. In an example, the conditional statement includes an if-else statement.

The sequential dependence relationship may mean that one instruction needs to be executed after another instruction is completed. It is to be noted that the memory dependence relationship, the data dependence relationship, and the control dependence relationship may all cause the sequential dependence relationship. In other words, the sequential dependence relationship includes the data dependence relationship, the memory dependence relationship, and the control dependence relationship.

After obtaining original instructions, the compiler may analyze a dependence relationship, and determine a dependence relationship that can be identified by the compiler, to establish a data dependence graph. In the data dependence graph, the instructions may be abstracted as instruction nodes. The foregoing determining a plurality of instructions in the program code and a dependence relationship between the plurality of instructions includes but is not limited to the following three cases.

In a first case, for instructions between which a dependence relationship can be identified in the plurality of instructions, a dependence relationship is established between the instructions.

In a second case, for instructions between which it can be identified that no dependence relationship exists in the plurality of instructions, it is determined not to establish a dependence relationship between the instructions.

In a third case, for instructions between which no dependence relationship can be identified in the plurality of instructions, in a first processing manner, the compiler may establish a speculative dependence relationship between a first instruction and a third instruction that satisfy a second preset condition. The first instruction is a read instruction, the third instruction is a storage instruction, and the speculative dependence relationship means that the first instruction may be dependent on the third instruction, and the first instruction is speculatively executable. For the speculative dependence relationship, the compiler may establish a dependence relationship between two instructions, and at the same time indicate that a subsequent instruction can be speculatively executed.

The second preset condition includes the first instruction is a read instruction, the third instruction is a storage instruction, the first instruction follows the third instruction in an ideal execution sequence, the first instruction may have a memory dependence relationship with the third instruction, and the memory dependence relationship means that a sequential dependence relationship exists between access instructions due to operations on a same address.

It is to be understood that the third case is mainly for access instructions, that is, storage instructions or read instructions. The compiler is mainly configured to analyze a memory dependence relationship between access instructions, that is, perform analysis related to memory aliasing.

In the third case, the compiler cannot identify whether a memory dependence relationship exists between access instructions, and needs to reach an execution state to know whether a memory dependence relationship exists. For this part of access instructions, a speculative dependence relationship may be established for a case in which a read instruction is followed by a storage instruction. For instructions that have a speculative dependence relationship, the graphflow apparatus 100 may perform a speculative operation on the instructions. It is to be noted that the foregoing case in which a read instruction is followed by a storage instruction means that the read instruction is followed by the storage instruction in an ideal execution sequence, and another instruction may exist between the two instructions or no other instruction may exist between the two instructions. Other cases in the following also follow a similar principle. For example, a case in which a read instruction is followed by another read instruction follows a similar principle. Details are not described again.

In a second processing manner of the third case, for access instructions between which no memory dependence relationship can be identified in the plurality of instructions, the compiler may not establish a dependence relationship, and the graphflow apparatus 100 directly speculatively executes the access instructions. Analysis of a memory dependence relationship between access instructions mainly includes the following four cases: a case in which a storage instruction is followed by a read instruction, a case in which a storage instruction is followed by another storage instruction, a case in which a read instruction is followed by another read instruction, and a case in which a read instruction is followed by a storage instruction. Processing manners in which no dependence relationship is established in the foregoing four cases are sequentially analyzed below.

In some examples, the reason for not establishing a dependence relationship in a case in which a read instruction is followed by a storage instruction is that in a subsequent instruction execution process, the graphflow apparatus 100 may query, by using an SB 142, a sequence and address information of previously issued access instructions, and read data from correct places. In a process of executing a program, the graphflow apparatus 100 actually stores data corresponding to a storage instruction in the SB 142, and correspondingly updates data stored in memory when execution of the program is completed. It is assumed that a read instruction is followed by a storage instruction in the program and the two have a same address. However, the storage instruction that is supposed to be issued after the read instruction is actually issued before the read instruction. Based on the sequence and address information, even if the storage instruction is issued before the read instruction, the graphflow apparatus 100 may find that the storage instruction with the same address follows the read instruction in the SB 142. In this case, the read instruction is indicated to read data from the memory instead of obtaining a value from the SB 142.

In some examples, the reason for not establishing a dependence relationship in a case in which a storage instruction is followed by another storage instruction is that because an order-preserving issuing sequence between the storage instructions does not affect efficiency of instruction execution, for a simple procedure, the graphflow apparatus 100 may select a total store ordering manner for the storage instructions. The total store ordering may also be referred to as absolute ordering. That is, the graphflow apparatus 100 may ensure that the storage instructions are executed strictly in an ideal sequence. Therefore, it is not necessary to establish a speculative dependence relationship between the storage instructions.

In some examples, a reason for not establishing a dependence relationship in a case in which a read instruction is followed by another read instruction is that if no storage instruction exists between two read instructions, when the two read instructions read a same address, a same value is obtained, and no sequence dependence exists. If no storage instruction exists between two read instructions, processing may be performed based on a case in which a storage instruction is followed by a read instruction.

In some examples, the compiler also does not need to establish a dependence relationship in a case in which a storage instruction is followed by a read instruction, and instead identifies an access sequence by using the graphflow apparatus 100. A principle of this is similar to that of a hardware solution for a case in which a read instruction is followed by a storage instruction. Each time after receiving a storage instruction, the graphflow apparatus 100 queries, by reading an LQ 141, a sequence and address information of previously issued read instructions. If a read instruction that has a same address and that is supposed to be issued after the storage instruction exists, the graphflow apparatus 100 triggers a speculation error for the read instruction, and executes the read instruction again. If such a read instruction does not exist, the storage instruction causes no problem due to out-of-order issuing.

Figure 3:
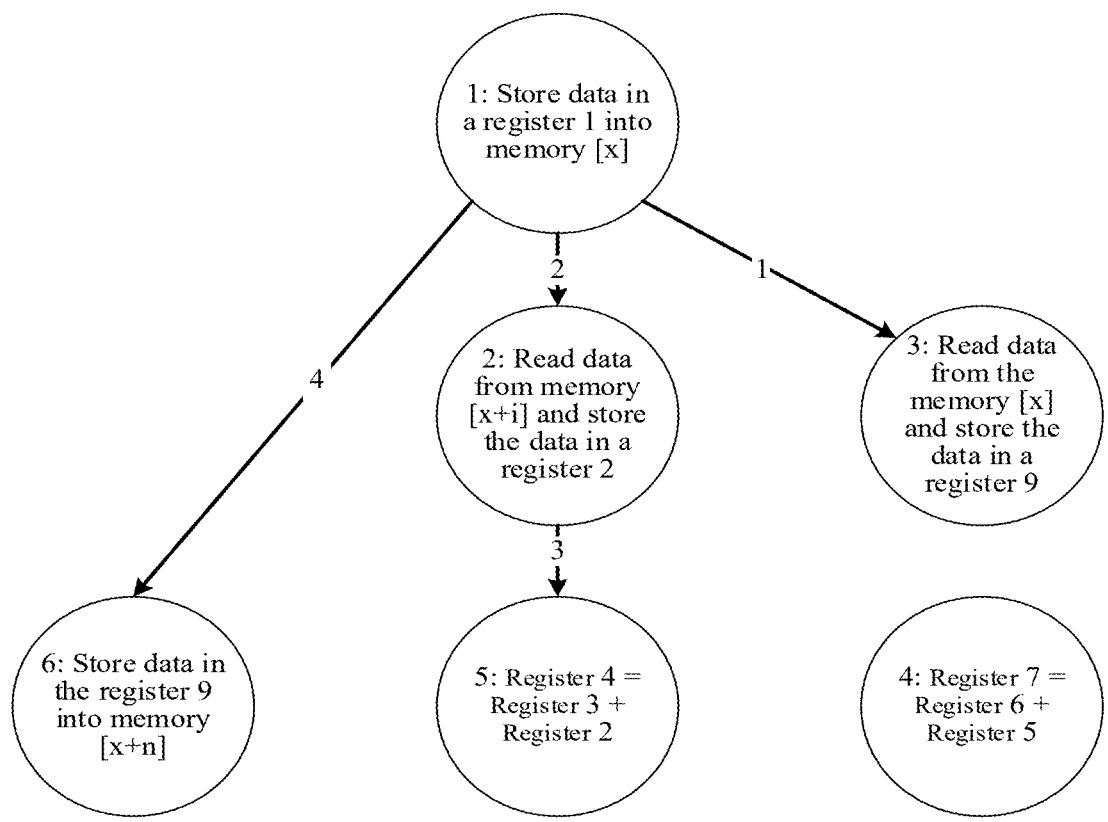
FIG. 3 is a schematic diagram of a data dependence graph according to an embodiment of this disclosure.

FIG. 3 is a schematic diagram of a data dependence graph according to an embodiment of this disclosure. As shown in FIG. 3, an instruction 1 represents storing data in a register 1 into memory [x]. An instruction 2 represents reading data from memory [x+i] and storing the data in a register 2. An instruction 3 represents reading data from the memory [x] and storing the data in a register 9. An instruction 4 represents storing the data in the register 9 into memory [x+n]. An instruction 5 represents adding values of a register 3 and the register 2 and storing a result into a register 4. An instruction 6 represents adding values of a register 6 and a register 5 and storing a result into a register 7.

The compiler may obtain the following results by analyzing dependence relationships between the foregoing instructions.

For the instruction 1 and the instruction 3, the compiler may identify that a memory dependence relationship and a sequential dependence relationship exist between the two instructions because both the instructions are storage operations on the address x. Therefore, the instruction 3 can be executed only after the instruction 1 is written into the memory, to ensure that correct data is read. For the clear sequential dependence relationship between the instruction 1 and the instruction 3, the compiler adds, between the two nodes, an edge (that is, an edge 1) representing the sequential dependence relationship.

For the instruction 1 and the instruction 2, if a value of i is 0, a sequential dependence relationship exists between the instruction 1 and the instruction 2. Because the instruction 1 writes data to the memory address x, the instruction 2 reads the data at the memory address x after the instruction 1 is executed. If the value of i is not 0, no sequential dependence relationship exists between the instruction 1 and the instruction 2. Because the value of i can be obtained only when the graphflow apparatus 100 is running and the compiler cannot learn of the value in advance, the compiler assumes that a speculative dependence relationship exists between the two instructions and adds an edge (that is, an edge 2) representing the speculative dependence relationship between the two nodes, to ensure correct running of a program.

For the instruction 2 and the instruction 5, a data dependence relationship exists between the two instructions, and can be identified by the compiler. Therefore, an edge (that is, an edge 3) representing that the data dependence relationship exists is added between the two instructions.

No dependence relationship exists between the instruction 4 and other read instructions, and this can be identified by the compiler. Therefore, a node that the instruction 4 is in does not have an edge representing a dependence relationship.

For the instruction 1 and the instruction 6, for a total store order of storage instructions, the storage instructions are connected in series to form an instruction dependence chain (that is, an edge 4 in FIG. 3) in an execution sequence. Optionally, the total store order of the storage instructions may be performed by hardware, and the compiler does not need to establish an instruction dependence chain.

S203: Determine a data dependence graph based on the plurality of instructions and the dependence relationship.

In embodiments of this disclosure, during compilation of a data dependence graph, if a read instruction is followed by another read instruction, a speculative dependence relationship may be established by using a feature of executing the data dependence graph in a dataflow architecture, so that the speculative dependence relationship is identified in a compilation phase, making it convenient for the dataflow architecture to perform a speculative operation when a program is subsequently executed. This improves efficiency of memory access based on the dataflow architecture.

Optionally, determining a plurality of instructions in the program code and a dependence relationship between the plurality of instructions further includes assigning stamps to access instructions in the plurality of instructions, where the stamps indicate an ideal execution sequence of the access instructions, and the access instructions include storage instructions or read instructions.

In some examples, the foregoing stamps are applied only to access instructions in the plurality of instructions, and are not applied to other types of instructions. For example, the instructions 4 and 5 in FIG. 3 are not access instructions, and therefore it is not necessary to assign stamps.

Optionally, when a plurality of branches exist in the access instructions of the plurality of instructions, counting starts from a last stamp of a first branch at a position where the plurality of branches converge, where the first branch is a branch that has a largest quantity of access instructions in the plurality of branches.

In embodiments of this disclosure, during compilation of the data dependence graph, the graphflow apparatus assigns stamps to the access instructions in the instructions, to indicate an ideal execution sequence of the access instructions. The stamps may be used as auxiliary information for instruction execution, to support correct execution of the access instructions. The stamps may provide a solution to an execution sequence when branches converge if a plurality of branches are in parallel. This improves efficiency of memory access based on a dataflow architecture.

Figure 4:
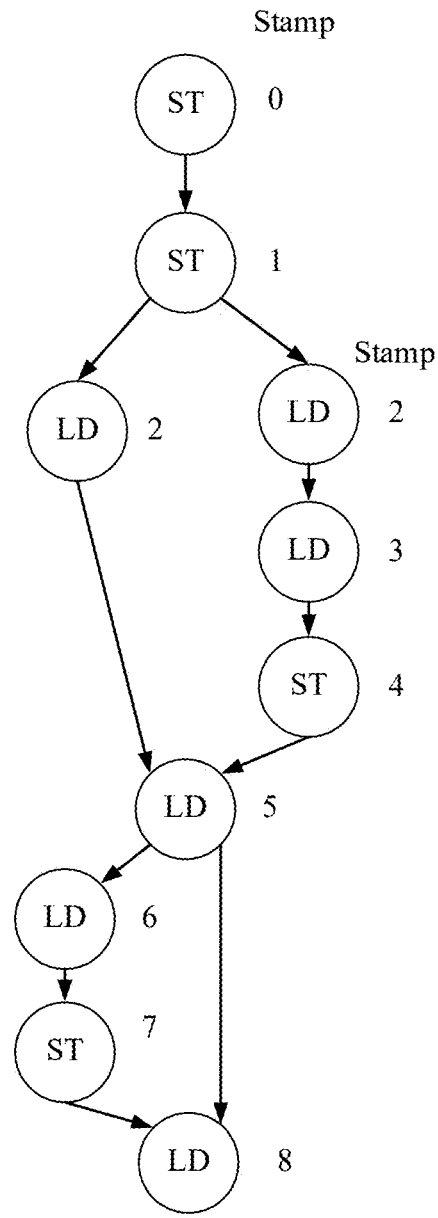
FIG. 4 is a schematic diagram of a data dependence graph with identified stamps according to an embodiment of this disclosure.

FIG. 4 is a schematic diagram of a data dependence graph with identified stamps according to an embodiment of this disclosure. ST represents a storage instruction, and LD represents a read instruction. As shown in FIG. 4, to ensure correct execution of access instructions, a compiler pre-assigns stamps to access instructions in a program based on an ideal execution sequence. For example, the stamps 1 to 8 are used to identify an ideal execution sequence of storage instructions. If the program encounters if-else branches, counting starts at the same stamp in each branch. During convergence at an end, counting starts from a last stamp of a branch that has a large quantity of access instructions. For example, two branches appear after the stamp 1, and therefore counting starts respectively at the stamp 2. In addition, at a position where the two branches converge, since the branch on the right includes more access instructions, counting continues with the last stamp 5 of the branch on the right.

A hardware-side solution in embodiments of this disclosure, that is, a solution on a side of the graphflow apparatus 100, is described below.

As shown in FIG. 1, in the graphflow apparatus 100, three storage apparatuses may be disposed to help implement access instructions. The three storage apparatuses include an IB 111, an LQ 141, and an SB 142. The IB 111 is configured to cache a dataflow instruction, and select an instruction that satisfies a condition for issuing and execution. The LQ 141 is used to cache a read instruction queue. The SB 142 is configured to cache a stored instruction queue. The SB 142 may be further configured to directly transfer data to the LQ 141, to avoid power consumption and latency caused by memory access.

Structures and functions of the IB 111, the LQ 141, and the SB 142 are described below in detail with reference to the accompanying drawings.

(1) IB 111:

FIG. 5 is a schematic diagram of a structure of an IB 111 according to an embodiment of this disclosure. As shown in FIG. 5, the IB 111 may include a plurality of fields. Definitions of the foregoing plurality of fields are shown in the following Table 1. It is to be noted that the fields in FIG. 5 are merely used as examples, and the IB 111 may further include more or fewer fields.

TABLE 1

| Field | Abbreviation or acronym | Definition |
| --- | --- | --- |
| Instruction field | Inst | Instruction field, representing a type of a current operation. |
| Parameter field | op0/1 | Used for storing input data of a current instruction. |
| Parameter field validity bit | vld0/1 | Representing whether a field of a corresponding parameter field is valid. |
| Parameter field presence bit | rdy0/1 | Representing whether data of a corresponding parameter field exists in a cache. |
| Speculative ID | spcID | Representing that a current parameter comes from a specific speculative operation. |
| Dependence validity bit | prd | Representing whether a current instruction can be executed only after execution of a previous instruction is completed. |
| Dependence presence bit | prdy | Representing that execution of an instruction on which a current instruction is dependent is completed. |
| Speculative bit | spc | Representing whether a current instruction is an instruction that can be speculatively executed. |
| Speculative flag bit | sgo | Representing whether a current instruction has been speculatively issued. |
| stamp | stamp | Used for representing an ideal execution sequence of access instructions. |
| Destination | dest0/1 | Representing a destination of a result of a current instruction. |
| Dependence destination. | pdest | Representing a destination of an execution completion status of a current instruction, or triggers a next instruction that is dependent on this instruction. |

The instruction field (Inst) and the parameter field (op0/1) are information required for assisting in running of the dataflow architecture, and are used to indicate the graphflow apparatus 100 to perform a related operation according to the instruction. The instruction field (Inst) may be used to indicate an operation type of an instruction, for example, a storage instruction (denoted as ST), a read instruction (denoted as LD), and the like. The parameter field (op0/1) is used for storing the input data of the current instruction. The input data may include an address, a parameter, or the like.

Optionally, each instruction may have one or more parameter fields (op0/1), one or more parameter field validity bits (vld0/1), and one or more parameter field presence bits (rdy0/1) in the IB 111. The parameter field (op0/1) has a one-to-one correspondence with the parameter field validity bit (vld0/1) and the parameter field presence bit (rdy0/1). In embodiments of this disclosure, an example in which two parameter fields (op0/1), two parameter field validity bits (vld0/1), and two parameter field presence bits (rdy0/1) are included is used for description.

In some examples, if an instruction requires only one parameter field, a parameter field validity bit (vld0) of a first parameter field (op0) is 1. A parameter field validity bit (vld1) of a second parameter field (op1) is 0. If an instruction requires two parameter fields, two parameter field validity bits (vld0/1) are both set to 1. It is to be noted that in embodiments of this disclosure, 1 represents that the field is valid, and 0 represents that the field is invalid. However, only an example is provided above. Optionally, 0 may be used to represent that the field is valid, and 1 may be used to represent that the field is invalid.

It is to be noted that the issuing an instruction may mean that the IB 111 starts to execute the instruction, and sends related information of the instruction to a corresponding unit in the graphflow apparatus 100, to facilitate execution of the instruction.

In some examples, the parameter field presence bit (rdy0/1) represents that an input required by the instruction already exists in op0/1. When a parameter field validity bit (vld0/1) and a parameter field presence bit (rdy0/1) of an instruction are both valid, it represents that an input required by the instruction is ready and can be issued and executed.

For example, if the parameter field validity bit (vld1) of the second parameter field is 1 and the parameter field presence bit (rdy1) of the second parameter field is 0, it represents that the instruction has an unprepared parameter field, and the instruction still cannot be issued and executed.

In a case, the graphflow apparatus 100 does not need to determine, based on that the parameter field validity bit (vld0/1) and the parameter field presence bit (rdy0/1) are both valid, whether the instruction can be executed. That is, for any instruction, when a speculative flag bit (sgo) of the instruction is 1, if any parameter field (op0/1) of the instruction is updated and a corresponding parameter field validity bit (vld0/1) is set to 1, the instruction can be issued and executed regardless of whether the other parameter field of the instruction is valid. When this case occurs, it represents that a speculative error occurs in a previous read instruction, and a subsequent instruction needs to be triggered and executed again. Therefore, the updated parameter field is a parameter field that causes a speculative error, and correct data may be inputted in this update. Data stored in another parameter field is data that has been stored during a previous speculative operation. Therefore, it is not necessary to determine whether the other parameter field is valid.

The dependence validity bit (prd) indicates whether the current instruction is executed only after execution of another instruction is completed. The dependence validity bit (prd) may represent a dependence relationship added by the compiler. For example, if the compiler determines that a dependence relationship exists between two instructions, the dependence validity bit (prd) may be set to "yes".

In some examples, the dependence validity bit (prd) only indicates a dependence relationship other than a data dependence. In other words, if the current instruction can be executed only depending on data transmitted by another instruction, the dependence validity bit (prd) may be not used for indication. In an example, the dependence validity bit (prd) may indicate a case in which the current instruction has a memory dependence or a control dependence on another instruction, and does not indicate a case in which the current instruction has a data dependence on the other instruction.

In some examples, if the current instruction has a speculative dependence relationship with another conditional instruction, the dependence validity bit may be set to "yes".

The dependence presence bit (prdy) corresponds to the dependence validity bit (prd), and the dependence presence bit (prdy) indicates whether execution of the instruction on which the current instruction is dependent is completed.

Optionally, if the dependence validity bit (prd) does not indicate a data dependence, correspondingly, the dependence presence bit (prdy) does not indicate whether execution of an instruction that has a data dependence relationship with the current instruction is completed, but indicates whether execution of an instruction that has a memory dependence relationship with the current instruction or a control dependence relationship with the current instruction is completed.

The speculative bit (spc) represents that the current access instruction can be speculatively executed. In an example, generally, an instruction with a dependence validity bit (prd) of 1 can be executed only after an instruction on which the instruction is dependent has been completed. However, for an access instruction, if a speculative bit (spc) of the access instruction is set to 1, the access instruction can be executed without waiting for completion of an access instruction on which the access instruction is dependent. In other words, the instruction can be executed without waiting for the dependence presence bit (prdy) corresponding to the dependence validity bit (prd) to change to 1. This case may be referred to as a speculative execution or a speculative operation on an access instruction. In addition, when the access instruction is speculatively issued, the speculative flag bit (sgo) may be set to 1.

In an example, if the compiler sets that the current instruction has a speculative dependence relationship with another instruction, in the IB 111, a dependence validity bit (prd) may be set to "yes", and a speculative bit (spc) may be set to "yes".

In an example, for an instruction for which the compiler cannot identify a memory dependence relationship, if the compiler does not set a speculative dependence relationship, in the IB 111, a speculative bit (spc) may be set to "yes", and a dependence validity bit (prd) may be set to "no". This is a second processing manner of the compiler in the third case in FIG. 2.

In other words, regardless of how the dependence validity bit (prd) is set, the instruction can be speculatively executed as long as the speculative bit (spc) is set to "yes".

Stamps represent an ideal execution sequence between access instructions, and are stored in an LQ or an SB when the access instructions are executed. It is to be noted that, in consideration of a case of a speculative execution, when a program is actually executed, an access instruction is not necessarily executed according to a sequence indicated by the stamps. If the speculative execution is not considered, the access instructions should be executed according to the sequence indicated by the stamps.

Optionally, after a read instruction is speculatively executed, the LQ 141 assigns an spcID to data that is speculatively read. The data obtained through the speculative operation may be referred to as speculative data. If the speculative data continues to be transferred in a subsequent instruction, an spcID field of an instruction that uses the speculative data and subsequent data derived from the data may carry information of the speculative ID, that is, carry information about a speculative source, to represent that the data is obtained through speculation. If a speculative error occurs, the subsequent instruction may be cleared and modified.

Figures 6, 7, 8:
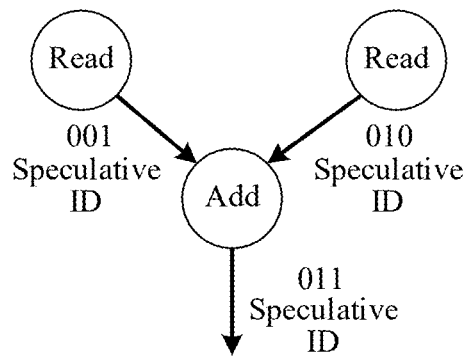
FIG. 6 is a schematic diagram of a structure of an LQ 141 according to an embodiment of this disclosure.
FIG. 7 is a schematic diagram of a speculative ID according to an embodiment of this disclosure.
FIG. 8 is a schematic diagram of a structure of an SB 142 according to an embodiment of this disclosure.

(2) LQ 141:

FIG. 6 is a schematic diagram of a structure of an LQ 141 according to an embodiment of this disclosure. As shown in FIG. 6, the LQ 141 includes a plurality of fields. Definitions of the foregoing plurality of fields are shown in the following Table 2. It is to be noted that the fields in FIG. 6 are merely used as examples, and the LQ 141 may further include more or fewer fields.

TABLE 2

| Field | Abbreviation or acronym | Definition |
|---|---|---|
| Address | addr | Used for storing an address field of a read instruction for memory search |
| Destination | dest | After data is read and returned, the data is sent to a parameter field of an IB indicated by a destination. |
| Data | data | Used for temporarily storing data returned by a read instruction. |
| stamp | stamp | Used for representing an ideal execution sequence of access instructions. |
| Speculative ID | spcID | Identity used for indicating that the read instruction is a speculative execution |
| Presence bit | rdy | Representing that data has been returned from memory or an SB. |
| Validity bit | vld | Representing that a read instruction is valid. |

After a read instruction is issued from the IB 111 to the LQ 141, the LQ 141 records information such as an address and a destination of the read instruction, and sets a validity position corresponding to the read instruction to 1, to represent that the read instruction is valid.

To ensure that the graphflow apparatus 100 can quickly clear subsequent operations derived from the speculative operation when a speculative error occurs subsequently, the LQ 141 assigns a speculative ID to the speculative operation on the read instruction. In addition, if the speculative ID is set to 0, it represents that the instruction is not speculatively generated.

Optionally, the speculative ID generated by the LQ 141 is a one-hot code, and the one-hot code is a code value that uses one bit to represent a state. In other words, a quantity of states is equal to a quantity of bits included in the one-hot code. Therefore, each bit in the one-hot code represents a speculative ID.

FIG. 7 is a schematic diagram of a speculative ID according to an embodiment of this disclosure. As shown in FIG. 7, when two inputs of an instruction come from different speculative IDs, both IDs need to be retained in the speculative ID of the instruction. If the speculative ID is a one-hot code, a new speculative ID can be obtained by performing an OR operation on the two speculative IDs. For example, one speculative ID is 001, and the other speculative ID is 010. A speculative ID obtained after the OR operation is performed is 011, and ID information of two speculative operations is still retained. If it is subsequently found that a speculative ID has a speculative failure, the graphflow apparatus 100 only needs to perform an AND operation on an incorrect ID and an ID that is currently being executed during check. If a result is not all 0s, it represents that the data comes from data of a speculative error.

The speculative ID is stored in both speculative ID (spc ID) fields corresponding to the LQ 141 and the IB 111. When returning the data, the LQ 141 transmits the speculative ID together with the data to a destination of the read instruction. Therefore, if an input of each instruction comes from a speculative operation, a source of the speculative operation can be quickly found. A function of carrying a speculative ID is that when the graphflow apparatus 100 finds that a speculative operation is incorrect, all instructions that use data from the speculative operation can be efficiently stopped and cleared.

In some examples, while writing a read instruction into the LQ 141, the graphflow apparatus 100 may query the SB 142 by using the stamp and the address in the read instruction. If the SB 142 has a storage instruction with a same address and a stamp of the storage instruction is less than a stamp of the current read instruction, that is, the storage instruction with the same address is prior to the read instruction, the graphflow apparatus 100 sends data of the storage instruction in the SB 142 to the LQ 142, and returns the data to the destination of the read instruction. If no request with a same address exists in the SB 142 or a stamp of a storage instruction with a same address is greater than the stamp of the current read instruction, that is, the storage instruction with the same address is later than the read instruction, the graphflow apparatus 100 issues the read instruction to memory. After the memory returns the data, the data is stored in a data (data) field of the LQ 142 and returned to the destination of the read instruction.

(3) SB 142:

FIG. 8 is a schematic diagram of a structure of an SB 142 according to an embodiment of this disclosure. As shown in FIG. 8, the SB 142 includes a plurality of fields. Definitions of the foregoing plurality of fields are shown in the following Table 3. It is to be noted that the fields in FIG. 8 are merely used as examples, and the SB 142 may further include more or fewer fields.

TABLE 3

| Field | Abbreviation or acronym | Description |
|---|---|---|
| Address | Addr | Address field of a storage instruction, and data may be stored in a corresponding memory location based on an address. |
| Data | data | Used for temporarily storing data of a storage instruction. |
| Stamp | stamp | Used for representing an ideal execution sequence of access instructions. |
| Speculative ID | spcID | Representing that an address or data of a storage instruction directly or indirectly comes from a speculative read operation. |
| Validity bit | vld | Representing that a storage instruction is valid. |

Optionally, for a read instruction whose address is the same as an address of the storage instruction, the SB 142 selects, based on a stamp of the read instruction, a storage instruction whose stamp is less than the stamp and that is closest to the stamp from at least one read instruction with the same address in the SB 142, and returns data, to save time for memory read. When a stamp is smaller, it represents that an instruction is closer to the top in a time sequence.

In some examples, in addition to recording the address and the data of the storage instruction, the SB 142 further records, by using the speculative ID, whether the address and the data come from speculative data. For example, if the SB 142 receives an instruction clear request. The instruction clear request indicates to clear an instruction that has an association relationship with a target speculative ID. The SB 142 performs a search to determine whether a speculative ID in a storage instruction cached by the SB 142 is associated with the target speculative ID. If the speculative ID is associated with the target speculative ID, a validity bit of the storage instruction is set to 0. If no speculative ID is associated with the target speculative ID, the instruction clear requests is ignored. After the SB 142 receives an indication of issuing an instruction, the SB 142 may sequentially issue storage instructions cached by the SB 142 to the memory.

An instruction processing method on a side of a graphflow apparatus is described next.

Figure 9:
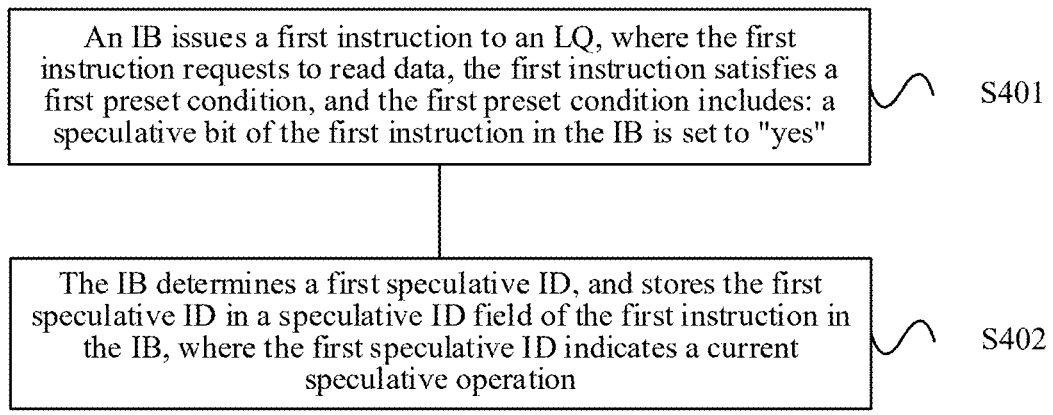
FIG. 9 is a schematic diagram of an instruction processing method according to an embodiment of this disclosure.

FIG. 9 is a schematic diagram of an instruction processing method according to an embodiment of this disclosure. The method may be performed by the graphflow apparatus 100. In FIG. 9, an IB may be the IB 111 in FIG. 1, an LQ may be the LQ 141 in FIG. 1, an SB may be the SB 142 in FIG. 1, and a PE may be the PE 110 in FIG. 1. The graphflow apparatus 100 is configured to execute instructions based on a data dependence graph. The method includes the following steps.

S401: The IB issues a first instruction to the LQ, where the first instruction requests to read data, the first instruction satisfies a first preset condition, and the first preset condition includes a speculative bit of the first instruction in the IB is set to "yes".

S402: The IB determines a first speculative ID, and stores the first speculative ID in a speculative ID field of the first instruction in the IB, where the first speculative ID indicates a current speculative operation.

For definitions of the spcID field and the speculative bit (that is, spc), refer to related descriptions in FIG. 5, and details are not described herein again.

Optionally, the case in which the speculative bit is "yes" includes a case in which the first instruction may be speculatively dependent on another instruction. For example, a speculative dependence relationship exists between the first instruction and a third instruction. The speculative dependence relationship represents that the first instruction may be dependent on the third instruction, and the first instruction is speculatively executable.

The first instruction and the third instruction satisfy a second preset condition, the second preset condition includes that the first instruction follows the third instruction in an ideal execution sequence, the first instruction may have a memory dependence relationship with the third instruction, and the memory dependence relationship means that a sequential dependence relationship exists between access instructions due to operations on a same address.

The second preset condition may be understood as that a dependence relationship caused by memory aliasing may exist between the first instruction and the third instruction. However, the compiler cannot identify the determined dependence relationship, and the dependence relationship can be determined only after the instructions are run. For instructions that have a speculative dependence relationship, the graphflow apparatus 100 may perform a speculative operation.

Optionally, the first preset condition further includes a dependence validity bit of the first instruction in the IB is set to "yes", and a dependence presence bit is set to "no". This represents that a dependence relationship exists between the first instruction and another instruction, and execution of an instruction that has a dependence relationship with the first instruction is not completed. However, a speculative operation may be performed on the first instruction. If the speculative operation is incorrect, the first instruction is subsequently re-executed.

Optionally, the IB further includes at least one parameter field, at least one parameter field validity bit, and at least one parameter field presence bit. The at least one parameter field is in a one-to-one correspondence with the at least one parameter field validity bit. The at least one parameter field validity bit is in a one-to-one correspondence with the at least one parameter field presence bit. The parameter field stores input data of a current instruction. The parameter field validity bit indicates whether a parameter field corresponding to the parameter field validity bit is valid. The parameter field presence bit indicates whether data of a parameter field corresponding to the parameter field presence bit exists in a cache.

Further, the first preset condition further includes a first parameter field validity bit in the at least one parameter field validity bit is set to "yes", and a parameter field presence bit corresponding to the first parameter field validity bit is set to "yes". It is assumed that the first parameter field validity bit corresponds to the first parameter field, representing that the first parameter field of the first instruction is valid and the input data is already stored in the first parameter field. For example, for a read instruction, the input data may be an address of the read instruction.

Optionally, the IB further includes stamps, the stamps indicate an ideal execution sequence of the access instructions, and the access instructions include storage instructions or read instructions. A stamp of the first instruction and a stamp of the third instruction indicate an ideal execution sequence in which the first instruction follows the third instruction.

Optionally, the SB and the LQ also include the stamps.

For definitions of the dependence validity bit (that is, prd), the parameter field (that is, op0/1), the parameter field validity bit (that is, vld0/1), the parameter field presence bit (that is, rdy0/1), and the stamp, refer to the foregoing related descriptions. Details are not described herein again.

In embodiments of this disclosure, a speculative bit and a speculative ID field are set for an instruction in an IB of the graphflow apparatus, so that the graphflow apparatus determines, based on the speculative bit, whether a speculative operation can be performed on the instruction, and indicates the speculative operation by using a speculative ID, so that a speculative source can be marked by using the speculative ID. When a speculative error occurs, only an instruction having an association relationship with the speculative ID is cleared and re-executed, and an instruction unrelated to the speculative ID is not re-executed. This reduces costs of the speculative error, and improves efficiency of executing a speculative operation on an access instruction in the dataflow architecture.

Further, the method further includes the following. After the first instruction is received, the LQ assigns the first speculative ID to the first instruction, and writes the first speculative ID into a speculative ID field of the first instruction in the LQ. The LQ transmits the first speculative ID to the speculative ID field of the first instruction in the IB.

Optionally, the speculative ID is a one-hot code. For a definition of the one-hot code, refer to the foregoing description.

In embodiments of this disclosure, the one-hot code is used for the speculative ID. Because a new speculative ID obtained after an OR operation is performed on two one-hot codes may still retain information about a previous speculative ID, after a speculative operation fails, a source of the speculative operation may be quickly found by using the one-hot code, to clear and re-execute an instruction related to the speculative operation. This improves efficiency of executing a speculative operation on an access instruction in the dataflow architecture.

Optionally, after the first instruction is received, the LQ searches, according to the first instruction, the SB or memory for and obtaining the data that the first instruction requests to read. The LQ may first search the SB for the data based on the address in the first instruction, and if the data does not exist, search the memory for the data.

Optionally, after the data that the first instruction requests to read is obtained, the LQ transmits the first speculative ID to a speculative ID field of a second instruction in the IB, where the second instruction is dependent on the first instruction.

After the speculative operation, the second instruction that has a dependence relationship with the first instruction also carries the first speculative ID, so that after the speculative operation fails, an instruction from the first speculative ID is searched for based on the first speculative ID.

Optionally, as shown in FIG. 7 above, if the second instruction further depends on another speculative operation, an OR operation may be performed on two speculative IDs corresponding to the two speculative operations, and a new speculative ID is obtained and used as the speculative ID of the second instruction.

Optionally, the method further includes the following. After the IB issues the first instruction to the LQ, the IB searches a speculative flag bit (that is, sgo) of the first instruction to "yes", to represent that the first instruction has been speculatively issued.

Optionally, the method further includes the following. After the data that the first instruction requests to read is obtained, the IB issues the second instruction, where the second instruction is dependent on the first instruction. After the second instruction is issued, the IB sets a speculative flag bit (that is, sgo) of the second instruction to "yes". That is, a subsequent instruction that has a dependence relationship with the first instruction may also be marked by a speculative flag bit (sgo).

Optionally, the method in FIG. 9 further includes the following. After the first instruction is issued, the IB issues the third instruction to the SB. After the third instruction is issued, the IB transfers a storage address of the third instruction to the parameter field of the first instruction in the IB, and sets the dependence presence bit of the first instruction in the IB to "yes". In other words, after the third instruction is issued, the IB may set the dependence presence bit of the first instruction to "yes", to represent that execution of the instruction on which the first instruction is dependent is completed.

Optionally, the method in FIG. 9 further includes the following. The IB determines, based on the storage address of the third instruction and a read address of the first instruction, whether a speculative operation on the first instruction corresponding to the first speculative ID is incorrect. The IB reselects and reissues the first instruction to the LQ if the speculative operation on the first instruction corresponding to the first speculative ID is incorrect.

For example, the first parameter field of the first instruction in the IB may be used to store the read address of the first instruction, and the second parameter field may be used to store the storage address of the third instruction.

Further, if the foregoing two addresses are equal, it means that a memory aliasing problem exists between the two instructions, and the speculative operation is incorrect. If the two addresses are not equal, it means that the speculative operation is correct.

Optionally, if the speculative operation corresponding to the first speculative ID is incorrect, the method in FIG. 9 further includes the following. The LQ reassigns a second speculative ID to the first instruction, and writes the second speculative ID into a speculative ID field of the LQ. The LQ transmits the second speculative ID to the speculative ID field of the first instruction in the IB.

Optionally, the method in FIG. 9 further includes the following. If the speculative operation on the first instruction is incorrect, the IB broadcasts the first speculative ID of the first instruction to at least one PE, the LQ, or the SB. The at least one PE, the LQ, or the SB compares the first speculative ID of an instruction being executed by the at least one PE, the LQ, or the SB, to determine whether an association relationship exists between the first speculative ID and the speculative ID of the instruction being executed. If an association relationship exists, the at least one PE, the LQ, or the SB stops executing the current instruction, and stops transmitting the data or the dependence relationship of the current instruction.

It may be understood that, if the speculative operation on the first instruction is incorrect, the IB broadcasts the first speculative ID of the first instruction to a pipeline in the graphflow apparatus 100, so that only an instruction related to the speculative operation is cleared, and an instruction that follows the speculative operation and that is unrelated to the speculative operation is not cleared. This reduces costs of a speculative failure and improves efficiency of the speculative operation.

The at least one PE may include a PE in which the IB is located and another PE. The broadcasting to the at least one PE may include broadcasting to a unit inside the at least one PE. For example, the IB or another functional unit may be included.

A manner of determining whether an association relationship exists may include determining whether a speculative ID of an instruction being executed is the same as the first speculative ID, or whether the speculative ID comes from the first speculative ID. For example, as described above, an AND operation is performed on a current speculative ID and the first speculative ID by using a feature of a one-hot code. If a result is not all 0s, it represents that an association relationship exists between the current speculative ID and the first speculative ID.

In embodiments of this disclosure, when a speculative error occurs, the graphflow apparatus may trace, based on the first speculative ID, a subsequent instruction that has an association relationship with the incorrect speculative operation, and stop transmitting data and a dependence relationship of the current instruction, to ensure a correct operation of the instruction. In addition, by using a speculative ID, only an instruction related to an incorrect speculative operation can be cleared, and an instruction unrelated to the speculative operation is retained. This improves efficiency of executing a speculative operation on an access instruction in the dataflow architecture.

Figure 10:
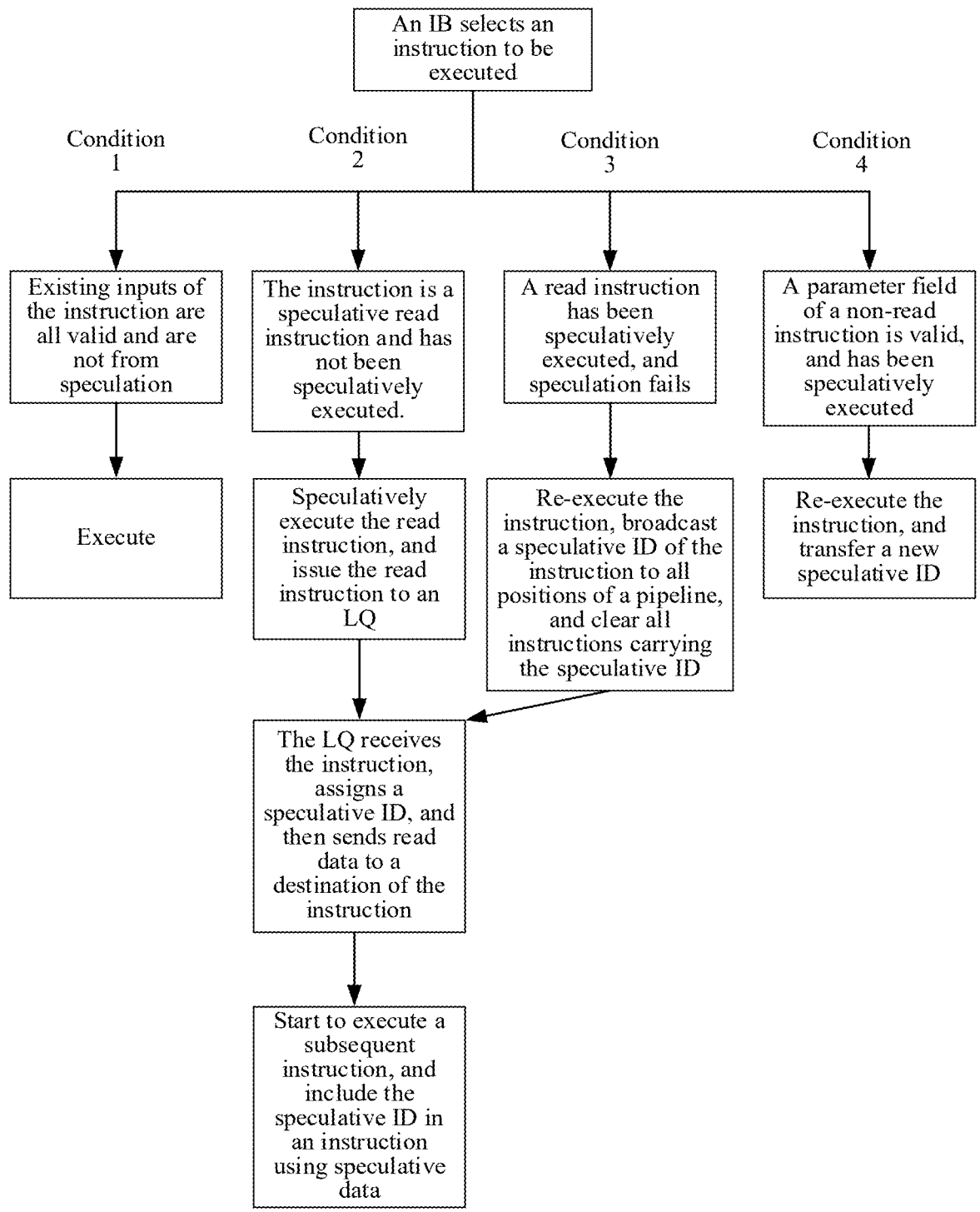
FIG. 10 is a schematic diagram of an instruction execution procedure of a graphflow apparatus according to an embodiment of this disclosure.

FIG. 10 is a schematic diagram of an instruction execution procedure of a graphflow apparatus 100 according to an embodiment of this disclosure. As shown in FIG. 10, when the graphflow apparatus 100 starts to run, an IB selects an instruction from instructions stored in the IB, and issues the instruction. The instruction satisfies any one of the following conditions and has the smallest stamp among the instructions that satisfy the conditions. The foregoing four conditions include:

Condition 1: Existing inputs of the instruction are all valid and are not from a speculative operation. That is, the inputs of the instruction are ready, and the inputs are not from speculative data. The inputs of the instruction further include a dependence relationship. That is, the instruction does not have a dependence relationship or execution of an instruction on which the instruction is dependent is completed.

Condition 2: The instruction is a speculative read instruction and has not been speculatively executed. That is, a speculative bit (spc) is set to 1, and a speculative flag bit (sgo) is set to 0. The condition 2 represents that the graphflow apparatus 100 speculatively executes the read instruction for the first time. The IB speculatively executes the read instruction, and issues the read instruction to an LQ.

Condition 3: The instruction is a read instruction that has been speculatively operated, and a previous speculative operation is incorrect. In other words, the graphflow apparatus determines that an address of the read instruction is the same as an address of the storage instruction, and a dependence relationship between the two instructions. In the case of the condition 3, because the previous speculative operation is incorrect, after the storage instruction on which the read instruction is dependent is executed, the address of the read instruction is updated. That is, a parameter field that is in the read instruction and that is used for storing an address is updated. Therefore, a parameter field validity bit (vld), a speculative flag bit (sgo), and a dependence presence bit (prdy) corresponding to the parameter field are all 1s.

The condition 3 represents that the graphflow apparatus 100 identifies that incorrect speculative data is sent before the read instruction. Therefore, the instruction needs to be re-executed, and a speculative ID is broadcast to a pipeline of the graphflow apparatus 100, to clear an instruction that has a relationship with the speculative ID.

Condition 4: The instruction is a non-read instruction, and a previous speculative operation is incorrect. The condition 4 represents that a current instruction has been executed by using incorrect speculative data. Therefore, the instruction needs to be executed again, and a new speculative ID needs to be transferred. Because an input of the instruction has been updated, a parameter field validity bit corresponding to a parameter field of the instruction is 1, and a speculative flag bit (sgo) is 1.

When an instruction satisfying the condition 2 or the condition 3 is selected, a read instruction enters the LQ, and the LQ assigns a speculative ID. After obtaining data, the LQ sends the data to a destination of the instruction. Subsequent instructions that have a dependence relationship with the instruction can all be speculatively executed. However, inputs of the subsequent instructions all need to carry the speculative ID.

Optionally, after a speculative operation is performed on the read instruction, if a storage instruction whose read instruction has a speculative dependence relationship is executed, the storage instruction may trigger hardware to identify whether a previous speculative operation on the read instruction fails. Further, the IB may issue the storage instruction to an SB, and send an address and dependence information to a destination indicated by the storage instruction. The destination may refer to a parameter field of an instruction that may be dependent on the storage instruction in the IB. After receiving the address, the IB compares the address sent in the storage instruction with an address of the IB. If the addresses are equal, it represents that previous speculation on the read instruction is incorrect. The hardware broadcasts the speculative ID of the read instruction, to stop the operation of an instruction that corresponds to the speculative ID and that is being executed. The data obtained by executing the storage instruction is stored in the SB until the IB sends an indication signal to indicate the SB to send the data stored in the SB to memory.

According to the foregoing description, the storage instruction may trigger the IB to identify a previous speculative failure of the read instruction. Therefore, after the storage instruction is executed, the read instruction is reselected by a selection logic of the IB, updated data is read from the SB, and the data is sent to a destination of the read instruction. In the IB, an instruction that has been speculatively executed and that is dependent on the read instruction is also executed again. Speculative flag bits of these instructions with a speculative failure are set to 1, representing that the instructions have been executed before by using speculative data. If a validity bit of a parameter field (op0/1) is set to 1, it represents that the data of the parameter field is updated. This represents that the data before the instruction comes from incorrect speculation, and new data causes re-execution of these instructions.

A speculation mechanism and a correction mechanism after an error occurs in speculation in embodiments of this disclosure are described below with reference to specific examples.

Figure 11:
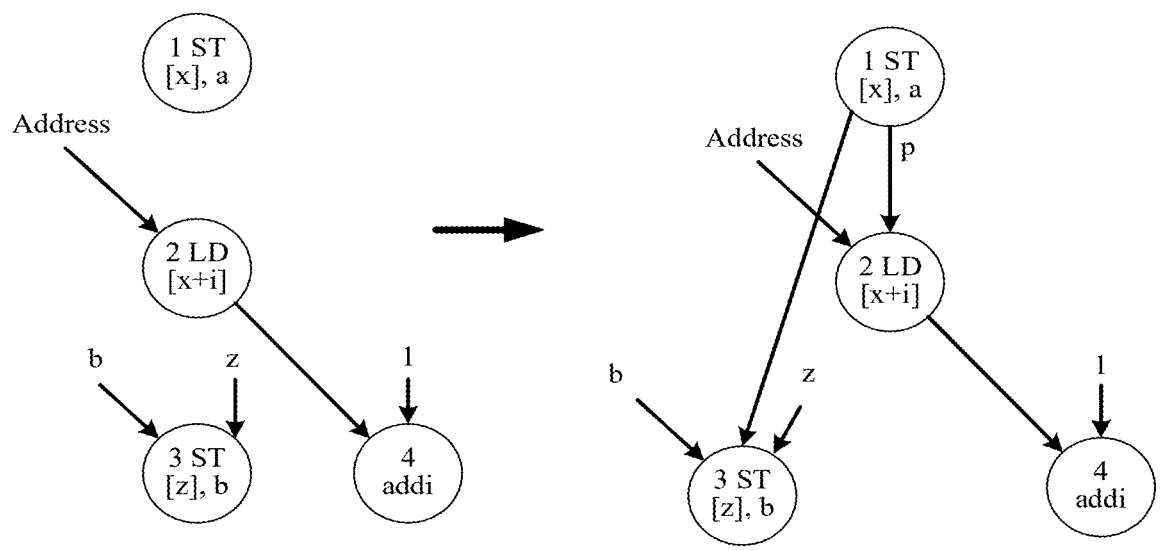
FIG. 11 is a schematic diagram of a data dependence graph according to an embodiment of this disclosure.

FIG. 11 is a schematic diagram of a data dependence graph according to an embodiment of this disclosure. FIG. 12 to FIG. 19 are respectively schematic diagrams of states of different stages of executing the data dependence graph in FIG. 11 by the graphflow apparatus 100, and show information content in the IB 111, the LQ 141, and the SB 142 in a process of executing instructions by the graphflow apparatus 100.

As shown in FIG. 11, the data dependence graph includes four instructions. The four instructions are abstracted as four nodes. An instruction 1 (ST[x], a) is a storage instruction, and indicates to store data a at an address x in memory. An instruction 2 (LD[x+i]) is a read instruction, and indicates to read data from an address x+i in the memory and transfer the data to an instruction 4. An instruction 3 (ST[z], b) is a storage instruction, and indicates to store data b at an address z in the memory. The instruction 4 (addi) is an addition instruction, and indicates to add two inputs. The two inputs respectively come from data of the instruction 2 and a constant 1.

Still refer to FIG. 11. The compiler may add a dependence relationship between nodes according to the rules in FIG. 2 to FIG. 4. In a case in which a storage instruction is followed by a read instruction (that is, the instruction 1 is followed by the instruction 2), because the compiler cannot know a value of i, the compiler cannot identify whether the address x+i is equal to the address x. Therefore, the compiler establishes a speculative dependence relationship (an edge p) between the two instructions.

In a case in which a read instruction is followed by a storage instruction (the instruction 2 is followed by the instruction 3), although the compiler cannot identify whether the address z is equal to the address x+i, according to a rule on a compiler side, a dependence relationship does not need to be established between the read instruction and the storage instruction.

For the instruction 1 and the instruction 3, the compiler may establish a total store ordering relationship for a case in which a storage instruction is followed by another storage instruction. Alternatively, a total store ordering relationship may be analyzed and established by hardware, and a dependence relationship is not established between the two instructions on the compiler side.

Figure 12:
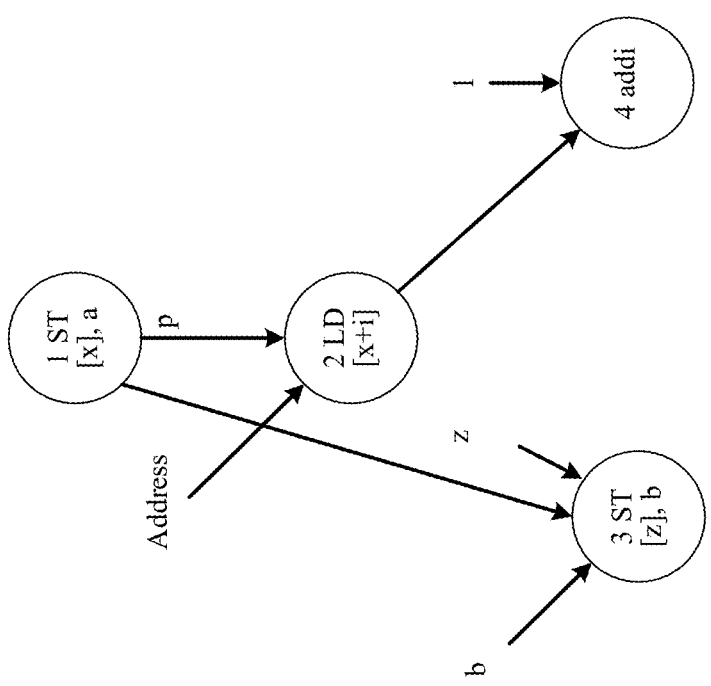
FIG. 12 to FIG. 19 are respectively schematic diagrams of states of different stages of executing the data dependence graph in FIG. 11 by the graphflow apparatus.

After completing initial configuration on the data dependence graph in FIG. 11, the compiler side may store a related instruction in the IB 111. FIG. 12 is a schematic diagram of information stored in the IB 111 by the instructions of the data dependence graph in FIG. 11. When a program starts to be executed, the graphflow apparatus 100 may select an instruction with a valid input to start execution. That valid input may mean that all data in a parameter field of the instruction is prepared, and an instruction on which the instruction is dependent is also executed.

As shown in FIG. 12, because the instruction 1 to the instruction 3 are access instructions, stamps need to be assigned. The stamps of the instructions in the IB 111 are sequentially 0, 1, and 2, which represents an ideal execution sequence of the instruction 1 to the instruction 3.

As shown in FIG. 12, the instruction 1, the instruction 3, and the instruction 4 all lack execution conditions. The instruction 1 lacks stored data and an address (op0/1 is empty). Input data of the instruction 3 is ready. However, according to the total store ordering principle between storage instructions, the instruction 3 can be executed only after execution of the instruction 1 is completed. For the instruction 3, a dependence validity bit (prdy) is 1, a dependence presence bit (prdy) is 0, and a speculative bit (spc) is 0. The instruction 4 lacks data from the instruction 2 as input data of the instruction 4.

As shown in FIG. 12, the instruction 2 lacks a flag representing that execution of an instruction on which the instruction 2 is speculatively dependent is completed, that is, a dependence presence bit (prdy) is 0. However, a speculative bit (spc) of the instruction 2 is set to 1. This means that the graphflow apparatus 100 can execute the instruction 2 without waiting for completion of execution of an instruction on which the instruction 2 is speculatively dependent on. A first parameter field validity bit (vld0) corresponding to the first parameter field (op0) of the instruction 2 is 1, and a first presence bit (rdy0) corresponding to the first parameter field (op0) is also 1. A second parameter field validity bit (vld1) corresponding to the second parameter field (op1) is 0. This means that the instruction 2 has only one piece of input data, and the input data already exists in the first parameter field (op0). Therefore, the instruction 2 can be issued.

The issuing an instruction may mean that the IB 111 issues information about the instruction to another unit to execute the instruction. For example, if the instruction is a storage instruction, the instruction may be issued to the SB 142. If the instruction is a read instruction, the instruction is issued to the LQ 141. If the instruction is an operation instruction, the instruction may be issued to a computing unit in the PE 110.

Figure 13:
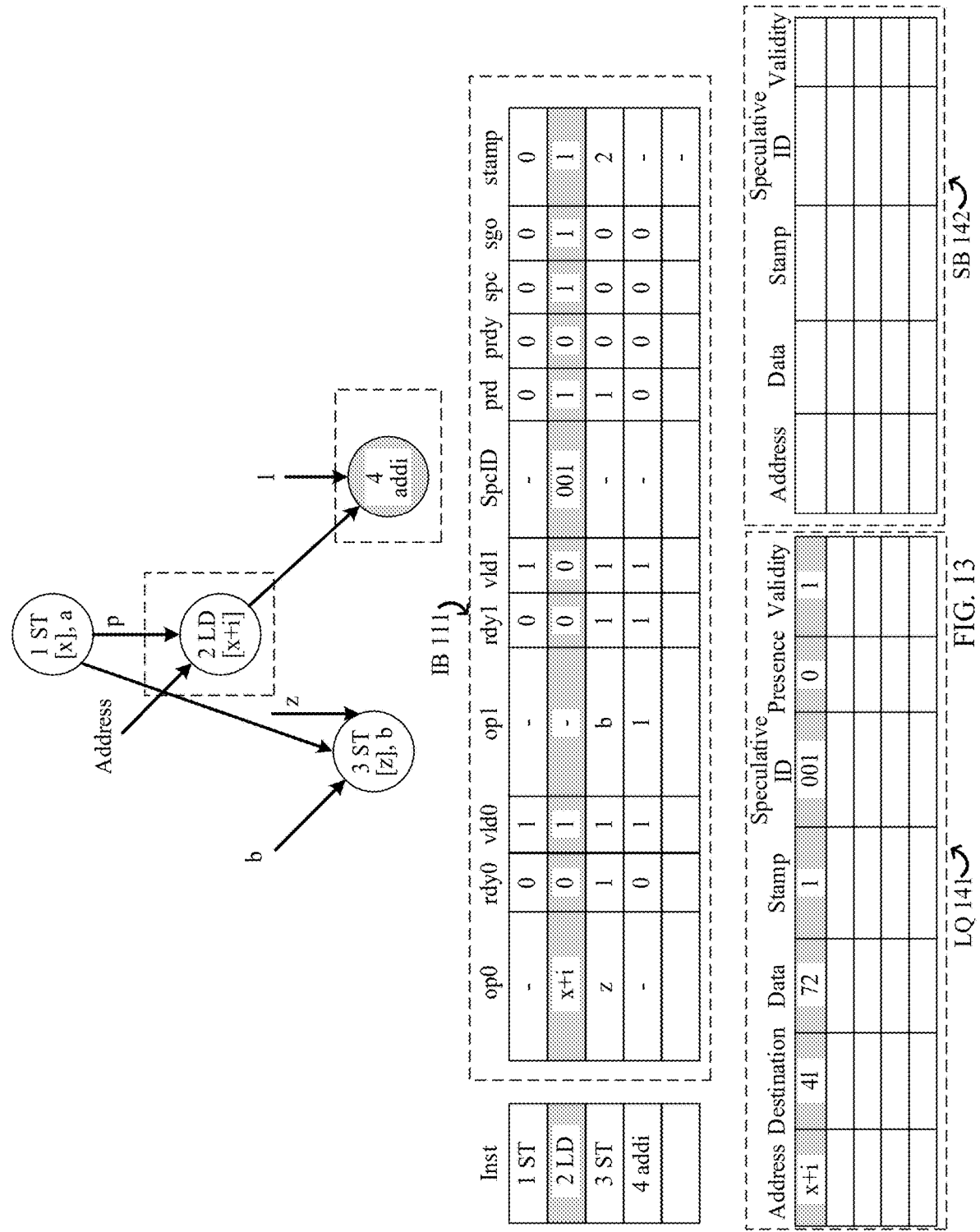

As shown in FIG. 13, after issuing the instruction 2, the IB 111 may set a first presence bit (rdy0) of the instruction 2 to 0, representing that data in the first parameter field (op0) of the instruction 2 is no longer valid. The speculative flag bit (sg0) is set to 1, representing that the instruction 2 is speculatively executed.

In addition, the instruction 2 is issued to the LQ 141, and the LQ 141 may record information about the instruction 2. The information may include information such as an address, a destination, and a stamp of the instruction 2.

The LQ 141 first searches the SB 142 based on the address in the instruction 2, and if the SB 142 does not have the data that the instruction 2 requests to read, issues the instruction 2 to the memory, to request to obtain the data.

The LQ 141 also assigns a speculative ID to the instruction 2 and writes the speculative ID into a speculative ID field of the LQ 141. In FIG. 13, "001" is used to represent the speculative ID. The LQ 141 is further configured to send the speculative ID to the IB 111, making it convenient to write the speculative ID into a speculative ID (spc ID) field of the IB 111.

After obtaining the data requested by the instruction 2, the LQ 141 may store the data in a data field of the LQ 141. In FIG. 13, "72" is used to represent the data.

Figure 14:
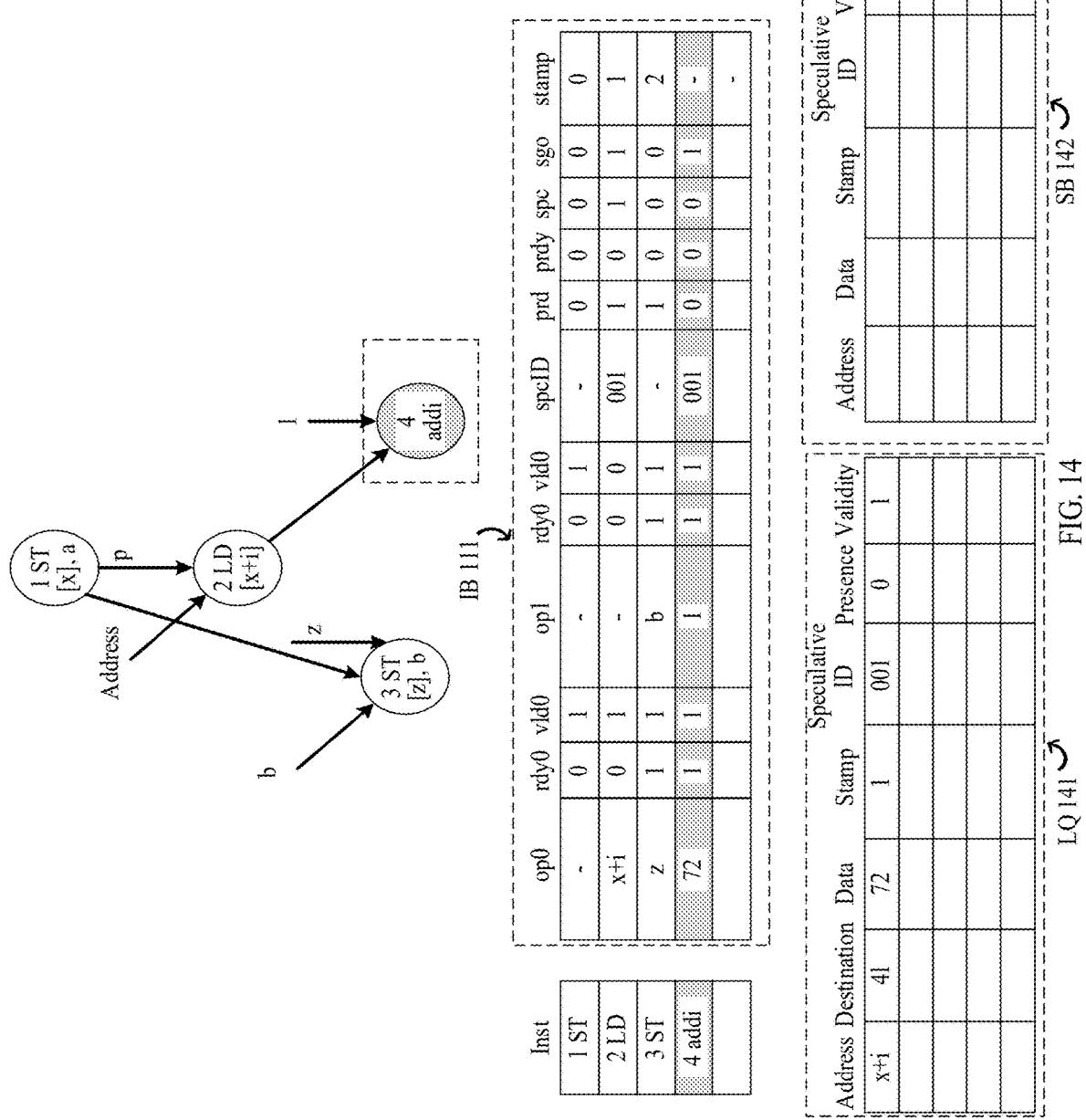

As shown in FIG. 14, after obtaining the data requested by the instruction 2, the LQ 141 may transmit the data to a first parameter field (op0) of the instruction 4 in the IB 111, and set a parameter field presence bit (rdy0) corresponding to the first parameter field (op0) to 1. Because the data is obtained through speculation, the IB 111 may write the speculative ID into an spcID field of the instruction 4. For a result of the instruction 4 obtained subsequently, if the result is obtained from the speculative data, when the result is transferred, the speculative ID also needs to be written into the spcID corresponding to a destination.

Figure 15:
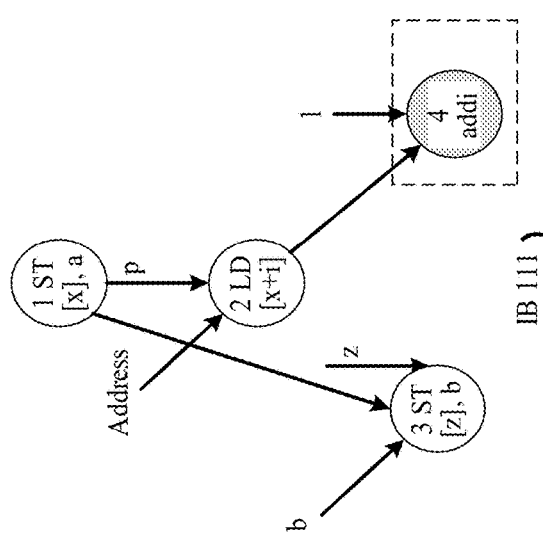

As shown in FIG. 15, the input data of the instruction 4 is ready, and the instruction 4 in the IB 111 may be executed. During execution, the instruction 4 may be issued to a computing device in the PE 110. Because the data of the instruction 4 comes from a speculative behavior, the speculative flag bit (sg0) is set to 1. In addition, after the instruction 4 is issued, the parameter field presence bit (rdy0/1) of the instruction 4 is set to 0, representing that the instruction 4 has been issued.

Figure 16:
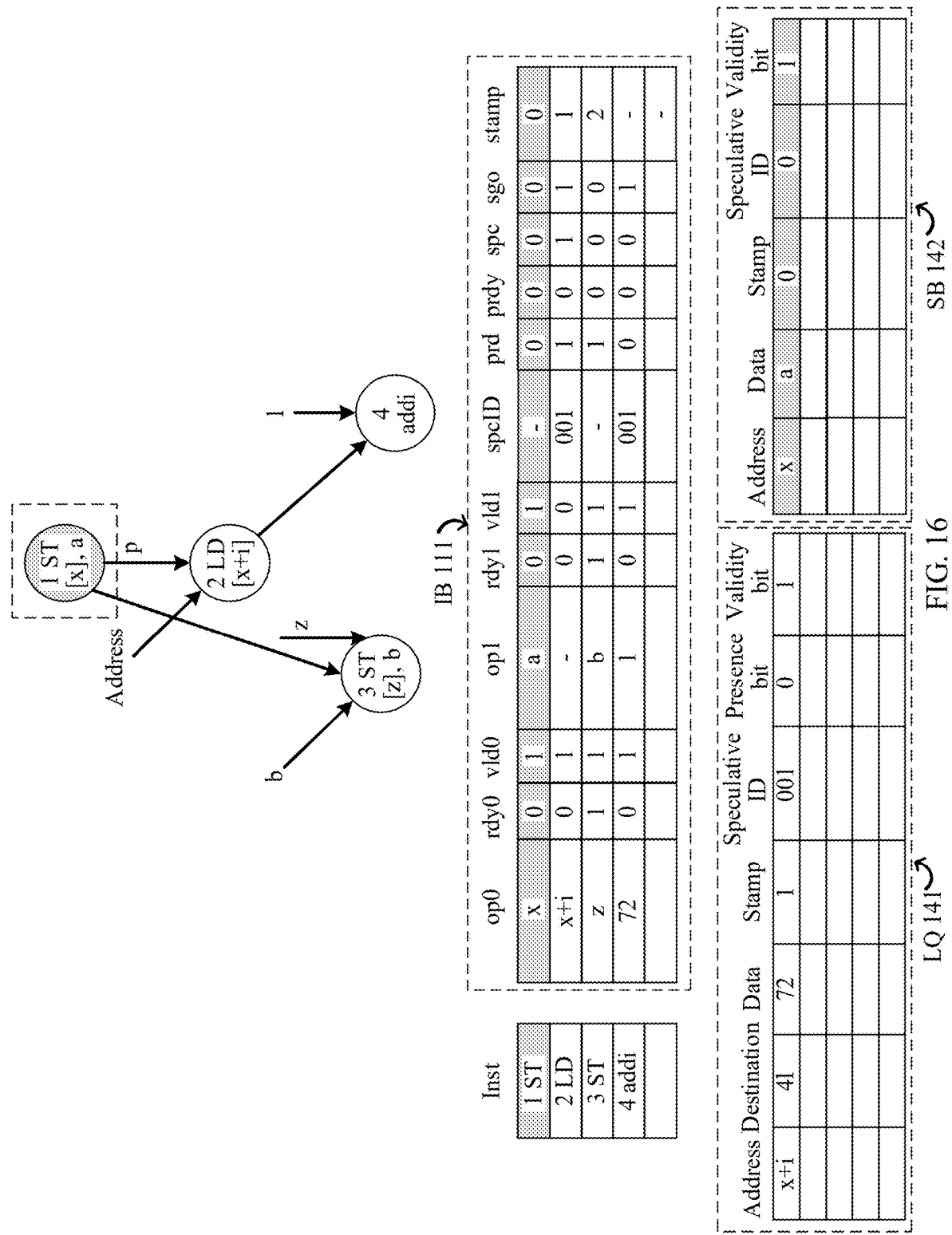

As shown in FIG. 16, after a clock cycle, all input data of the instruction 1 is ready. The IB 111 sends information about the instruction 1 to the SB 142. The SB 142 records information such as an address, data, a stamp, and a speculative ID of a storage request of the instruction 1. The address of the instruction 1 is x, the data is a, and the stamp is 0. The instruction 1 is not a speculative behavior, and therefore no speculative ID is assigned to the instruction 1. The speculative ID is set to 0.

In addition, the IB 111 sets the parameter field presence bit (rdy0/1) of the instruction 1 to 0, to represent that data stored in the parameter field (op0/1) has been transmitted.

Figure 17:
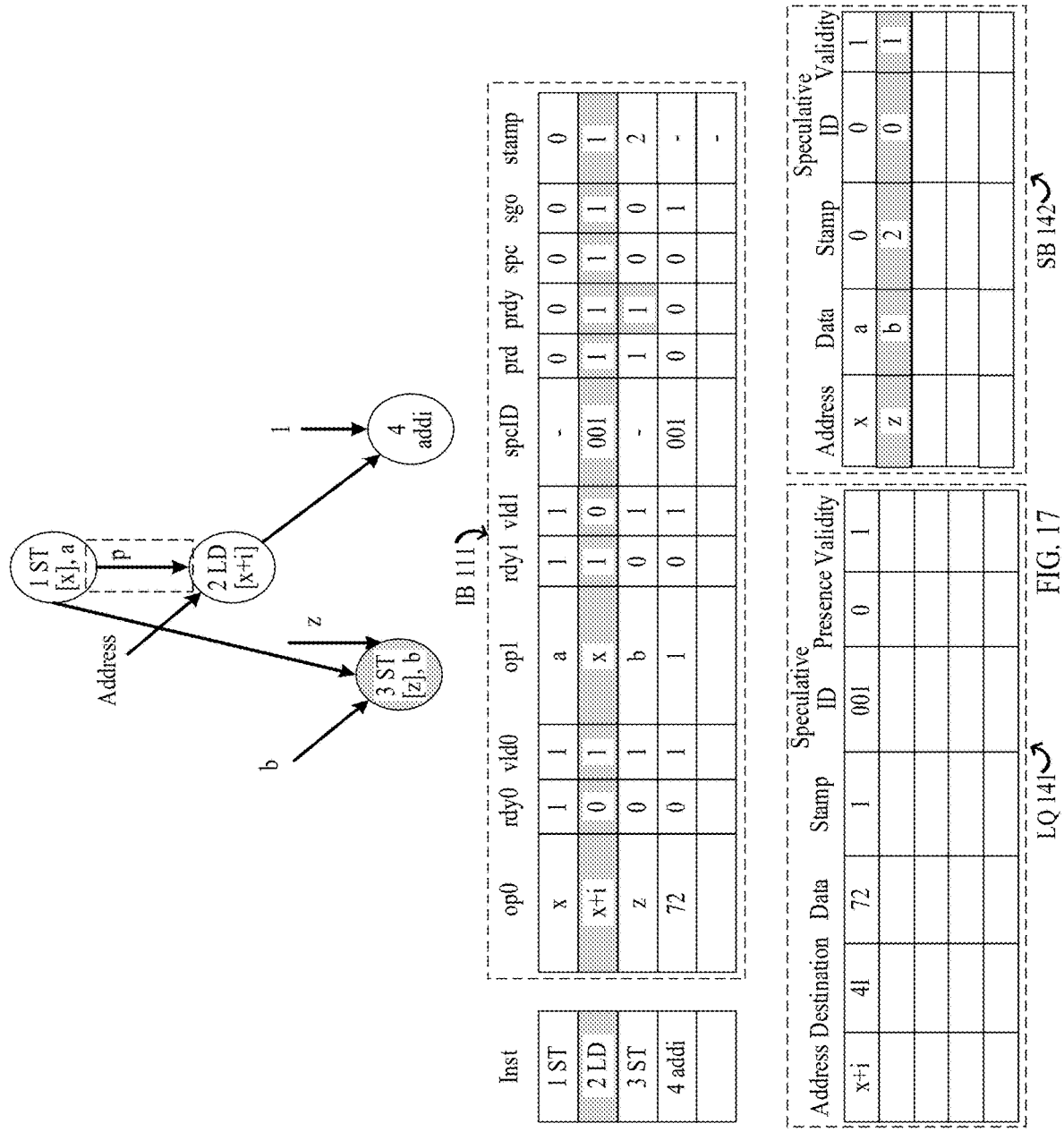

As shown in FIG. 17, after the instruction 1 is executed, the IB 111 sends a dependence indication and a storage address to a destination of the instruction 1. The dependence indication indicates that an instruction that the instruction 2 is speculatively dependent on is completed. The storage address is an address for reading data of the instruction 1.

Optionally, the sending a dependence indication to a destination includes setting a dependence presence bit (prdy) of the instruction 2 in the IB 111 to 1, to indicate that execution of the instruction on which the instruction 2 is speculatively dependent is completed.

Optionally, the sending a storage address to a destination includes writing an address of reading data of the instruction 1 into a second parameter field (op1) of the instruction 2 in the IB 111, and setting a parameter field presence bit (rdy1) corresponding to the second parameter field to 1.

The IB 111 performs comparison to determine whether an address (stored in op1) that is newly written by the instruction 2 into the IB 111 is equal to an address (stored in op0) at which the instruction 2 is speculatively executed. If the two values are equal, it represents that a read operation that is speculatively performed before the instruction 2 is incorrect. Therefore, the IB 111 re-executes the instruction 2. If the two are not equal, the instruction 2 does not need to be re-executed, and the parameter field presence bit (rdy1) and the dependence presence bit (prdy) of the second parameter field of the instruction 2 in the IB 111 are set to 0.

Optionally, after executing the instruction 1, the IB 111 may further set a dependence presence bit (prdy) of the instruction 3 in the IB to 1, to represent that execution of the instruction 1 on which the instruction 3 is dependent is completed.

Optionally, according to a total store ordering principle between storage instructions, the instruction 3 can be executed only after the instruction 1 is issued. As shown in FIG. 17, the dependence presence bit (prdy) of the instruction 3 is set to 1, and the input data of the instruction 3 is already ready. Therefore, the instruction 3 may be issued to the SB 142. After the instruction 3 enters the SB 142, the SB 142 may record information including the address, the data, the stamp, and the speculative ID of the instruction 3. The address is z, the data is b, and the stamp is 2. Because neither the address nor the data of the storage instruction comes from speculation, the speculative ID is 0.

Optionally, it is assumed that the speculative execution before the instruction 2 is incorrect. The IB 111 broadcasts the spcID of the instruction 2 to each level of pipeline of the hardware. After receiving the speculative ID, each level of pipeline performs comparison on the speculative ID of the instruction being executed, to determine whether an association relationship exists between the speculative ID and the speculative ID of the instruction currently being executed by the pipeline.

Each level of pipeline above may refer to a unit that is in the graphflow apparatus 100 and that is configured to execute an instruction, and includes but is not limited to the IB 111, the LQ 141, the SB 142, and the PE 110.

For example, the speculative ID is generally a one-hot code. If a bit is 1 in both speculative IDs, it means that an association relationship exists between the two. Therefore, execution of the current instruction needs to be stopped and transmission of data or a dependence relationship of the current instruction needs to be stopped. If no bit is 1 in both speculative IDs, it means that no association relationship exists between the two, and no execution operation is affected.

Figure 18:
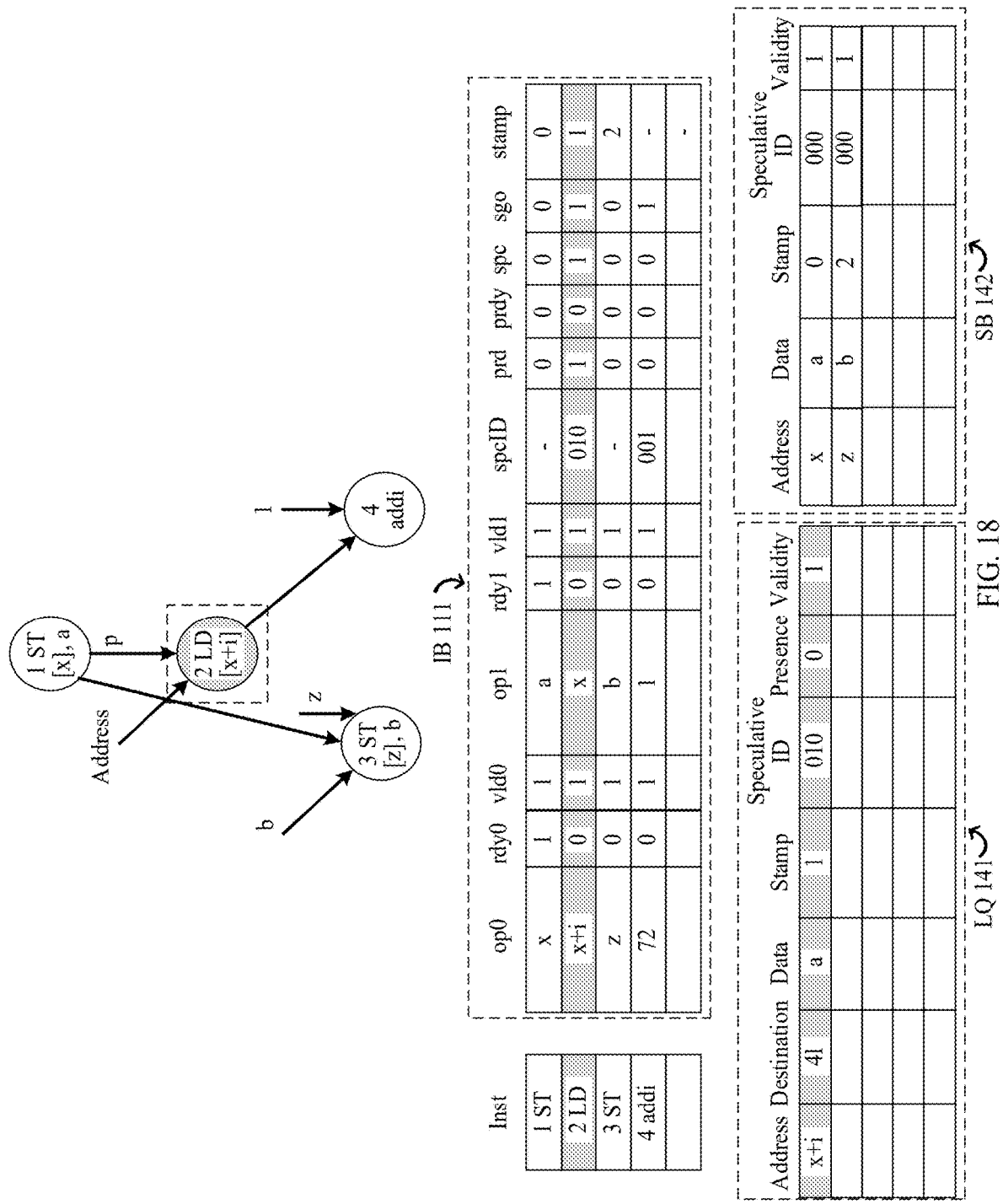

As shown in FIG. 18, after the instruction 2 is reissued to the LQ 141, the LQ 141 replaces the previous instruction 2 with a new instruction 2, and assigns a new speculative ID to the instruction 2. For example, the newly assigned speculative ID in FIG. 18 is represented as "010". The LQ 141 re-searches for the SB 142 or the memory based on the new instruction 2, and obtains the data requested by the instruction 2. In FIG. 18, the data is represented as data a.

Figure 19:
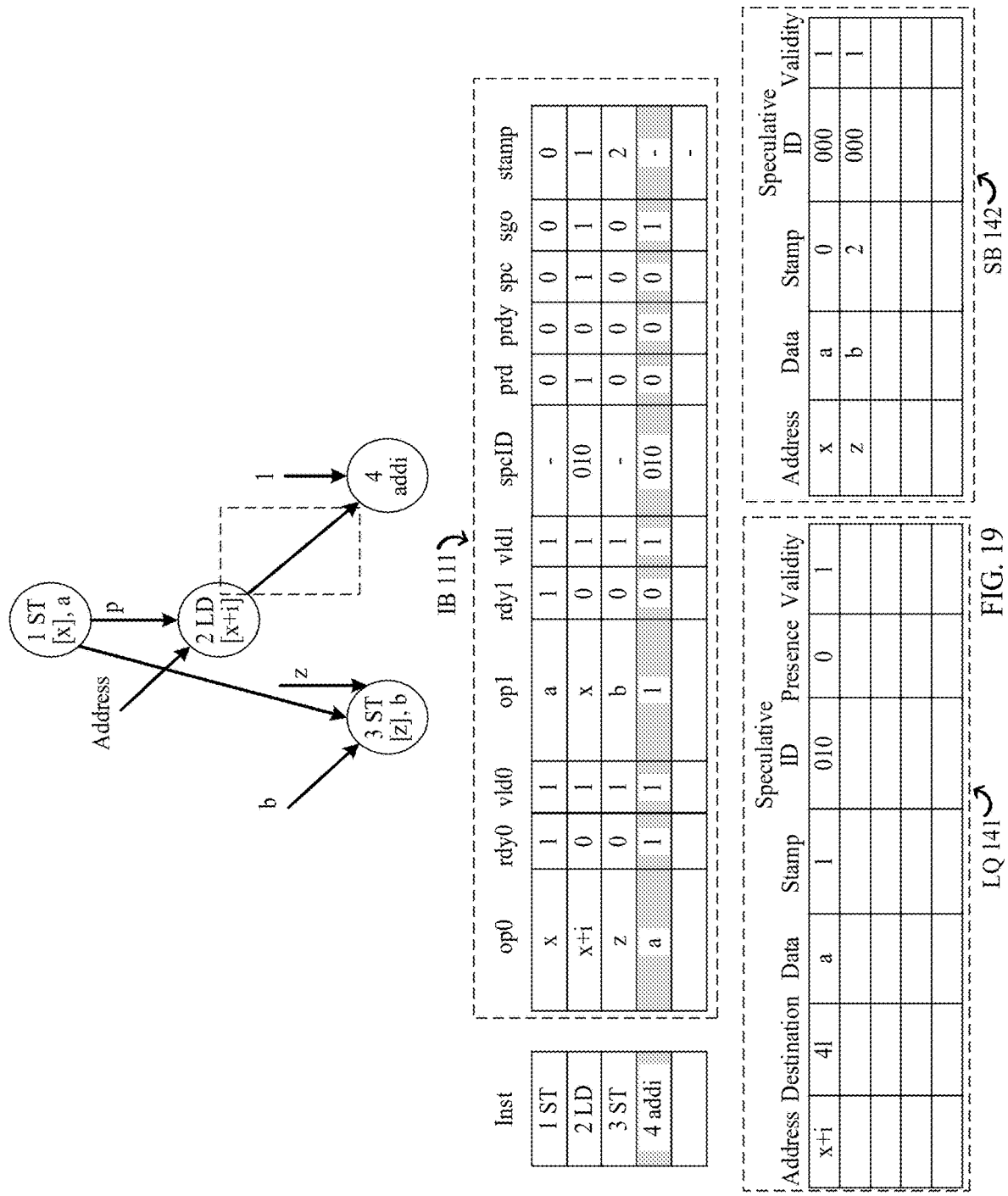

After the instruction 2 is completed, because a data dependence relationship exists between the instruction 4 and the instruction 2, the IB 111 needs to re-execute the instruction 4. As shown in FIG. 19, after obtaining the data a requested by the instruction 2, the LQ 141 issues the data a and the speculative ID to a destination of the instruction 2 again, and updates the speculative ID of the destination. For example, the destination of the instruction 2 is the first parameter field (op0) of the instruction 4, and an updated speculative ID is "010".

After the instruction 4 obtains the data transmitted by the instruction 2, the parameter field presence bit (rdy0) of the first parameter field (op0) is 1, and the parameter field validity bit (rdy1) of the second parameter field (op1) is 0. This represents that the data in the second parameter field (op1) is not ready. However, according to the foregoing execution rule of the IB 111, because the speculative flag bit (sg0) in the IB 111 is set to 1, it means that the instruction 4 has been speculatively executed. Therefore, data in the second parameter field (op1) always exists in the IB 111, and the instruction 4 may be re-executed.

After the instruction 4 is executed, the instructions in the data dependence graph in FIG. 11 have all been executed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it is to be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:

issuing, by an information buffer (IB) of one or more process engines (PEs) of a graphflow apparatus, a first instruction to a load queue (LQ) of a load store unit (LSU) of the graphflow apparatus, wherein the first instruction requests to read data and satisfies a first preset condition, wherein the first preset condition comprises a speculative bit of the first instruction in the IB being set to "yes", wherein the speculative bit indicates whether the first instruction is a speculatively-executable instruction, wherein a first speculative identity (ID) indicates a current speculative operation, and wherein the LQ assigns the first speculative ID to the first instruction; and storing, by the IB, the first speculative ID in a first speculative ID field of the first instruction in the IB.

2. The method of claim 1, wherein the first speculative ID is a one-hot code.

3. The method of claim 1, further comprising:

searching, by the LQ based on the first instruction, a store buffer (SB) or a memory for the data; and obtaining, by the LQ, the data from the SB or the memory.

4. The method of claim 3, further comprising transmitting, by the LQ, the first speculative ID to a second speculative ID field of a second instruction in the IB, wherein the second instruction is dependent on the first instruction.

5. The method of claim 1, wherein after issuing the first instruction, the method further comprises setting, by the IB, a speculative flag bit of the first instruction in the IB to "yes," and wherein the speculative flag bit indicates whether the first instruction has been speculatively issued.

6. The method of claim 1, further comprising:

obtaining, by the LQ, the data;

issuing, by the IB after obtaining the data, a second instruction dependent on the first instruction; and setting, by the IB after issuing the second instruction, a speculative flag bit of the second instruction in the IB to "yes".

7. The method of claim 1, wherein the first preset condition further comprises:

a dependence validity bit of the first instruction being set to "yes", wherein the dependence validity bit indicates whether the first instruction is executed after execution of a second instruction is completed; and a dependence presence bit in the IB being set to "no", wherein the dependence presence bit indicates whether execution of the second instruction on which the first instruction is dependent is completed.

8. The method of claim 1, further comprising:

issuing, by the IB, a second instruction to a store buffer (SB) of the LSU, wherein the second instruction is a storage instruction, wherein the first instruction and the second instruction satisfy a second preset condition, wherein the second preset condition comprises that the first instruction follows the second instruction, wherein the first instruction comprises a memory dependence relationship with the second instruction, and wherein the memory dependence relationship indicates an existing sequential dependence relationship between access instructions due to operations on a same address; and sending, by the IB, a storage address of the second instruction to the LQ.

9. A graphflow apparatus comprising:
one or more process engines (PEs), wherein each of the one or more PEs is configured to comprise:
an information buffer (IB) comprising:
a first speculative bit indicating whether a current instruction is a speculatively-executable instruction; and
a first speculative identity (ID) field storing a first speculative ID of a speculative operation on the current instruction; and
a load store unit (LSU) coupled to the IB and comprising a load queue (LQ), wherein the LQ is configured to store read instructions that request to read data from memory, and wherein the IB is configured to: issue, to the LQ, a first instruction requesting to read the data, wherein the first instruction satisfies a first preset condition, wherein the first preset condition comprises a speculative bit of the first instruction in the IB being set to "yes", wherein a second speculative ID indicates a current speculative operation, and wherein the LQ assigns the second speculative ID to the first instruction; and store the second speculative ID in a speculative ID field of the first instruction in the IB.

10. The graphflow apparatus of claim 9, wherein the first speculative ID is a one-hot code.

11. The graphflow apparatus of claim 9, wherein the LQ is further configured to: search, based on the first instruction, a store buffer (SB) or the memory for the data; and obtain the data from the SB or the memory.

12. The graphflow apparatus of claim 11, wherein the LQ is further configured to transmit the first speculative ID to a second speculative ID field of a second instruction in the IB, and wherein the second instruction is dependent on the first instruction.

13. The graphflow apparatus of claim 9, wherein the IB is further configured to:
issue, after obtaining the data, a second instruction that is dependent on the first instruction; and
set, after issuing the second instruction, a speculative flag bit of the second instruction to "yes".

14. The graphflow apparatus of claim 9, wherein the IB further comprises a first speculative flag bit indicating whether the current instruction has been speculatively issued.

15. The graphflow apparatus of claim 14, wherein after issuing a first instruction, the IB is configured to set a second speculative flag bit of the first instruction to "yes".

16. A computer program product comprising computer-executable instructions that are stored on a non-transitory computer storage medium and that, when executed by one or more processors, cause a graphflow apparatus to:
issue, using an information buffer (IB) of one or more process engines (PEs) of the graphflow apparatus, an instruction to a load queue (LQ) of a load store unit (LSU) of the graphflow apparatus, wherein the instruction requests to read data and satisfies a preset condition, wherein the preset condition comprises a speculative bit of the instruction in the IB being set to "yes", wherein the speculative bit indicates whether the instruction is a speculatively-executable instruction, wherein a speculative identity (ID) indicates a current speculative operation, and wherein the LQ assigns the speculative ID to the instruction; and
store, by the IB, the speculative ID in a speculative ID field of the instruction in the IB.

17. The computer program product of claim 16, wherein the speculative ID is a one-hot code.

18. The computer program product of claim 16, wherein after issuing the instruction, the computer-executable instructions, when executed by the one or more processors, cause the graphflow apparatus to set, by the IB, a speculative flag bit of the instruction in the IB to "yes," and wherein the speculative flag bit indicates whether the instruction has been speculatively issued.

19. The computer program product of claim 16, wherein the preset condition further comprises:
a dependence validity bit of the instruction being set to "yes", wherein the dependence validity bit indicates whether the instruction is executed after execution of a second instruction is completed; and
a dependence presence bit in the IB being set to "no", wherein the dependence presence bit indicates whether execution of the second instruction on which the instruction is dependent is completed.

* * * * *